April 28, 1953 W. S. GUBELMANN 2,636,401
AUTOMATIC CHANGE-SPEED TRANSMISSION
Filed July 8, 1944 20 Sheets-Sheet 5

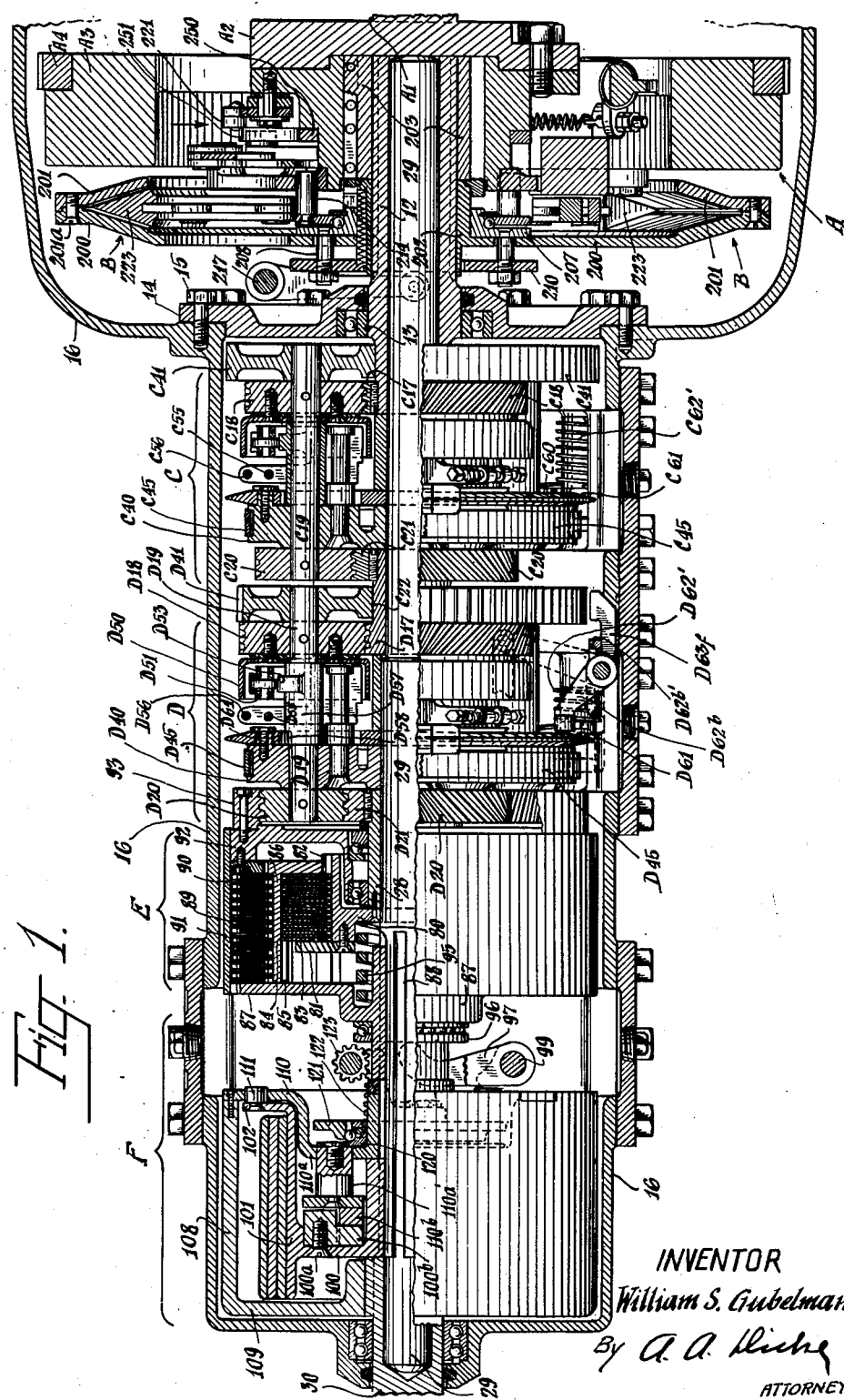

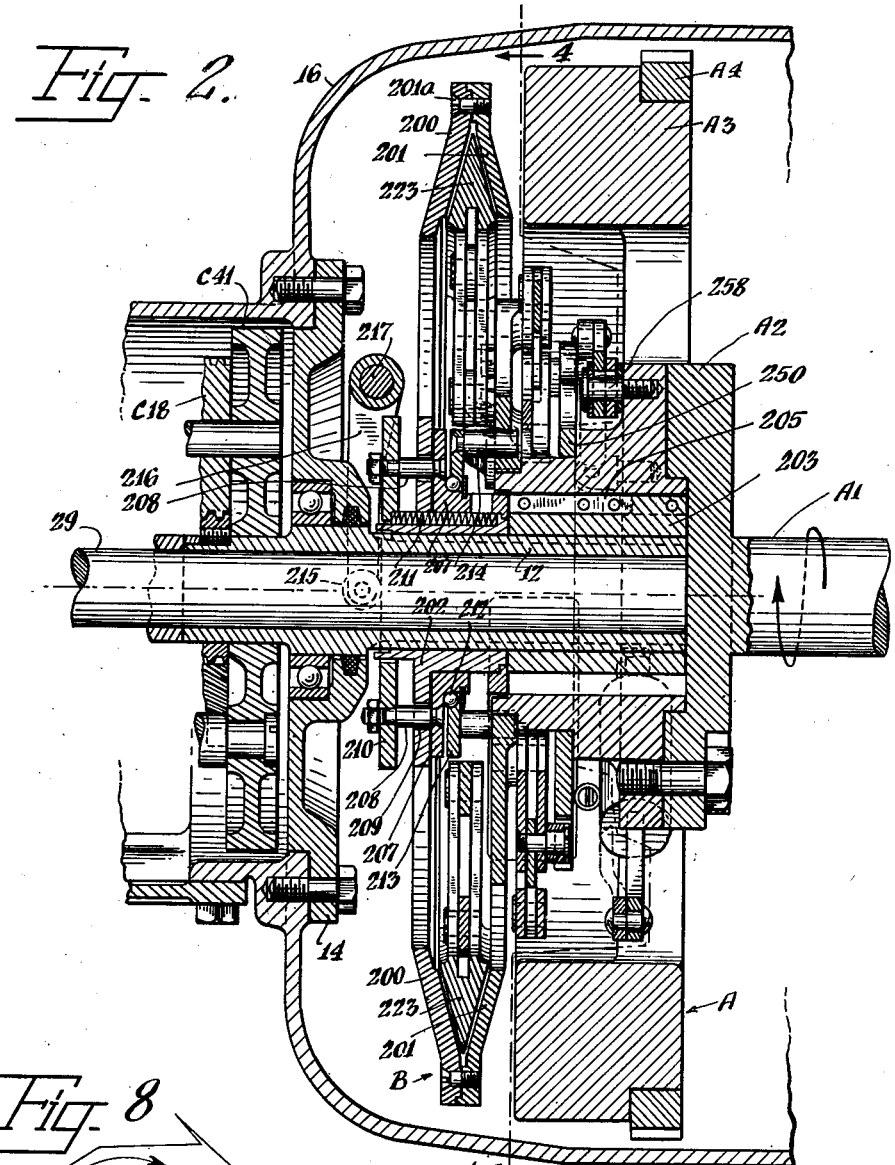
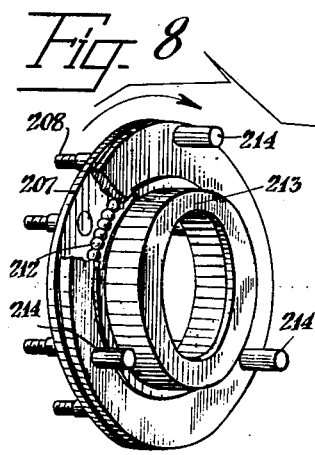
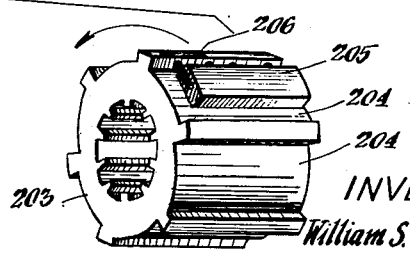

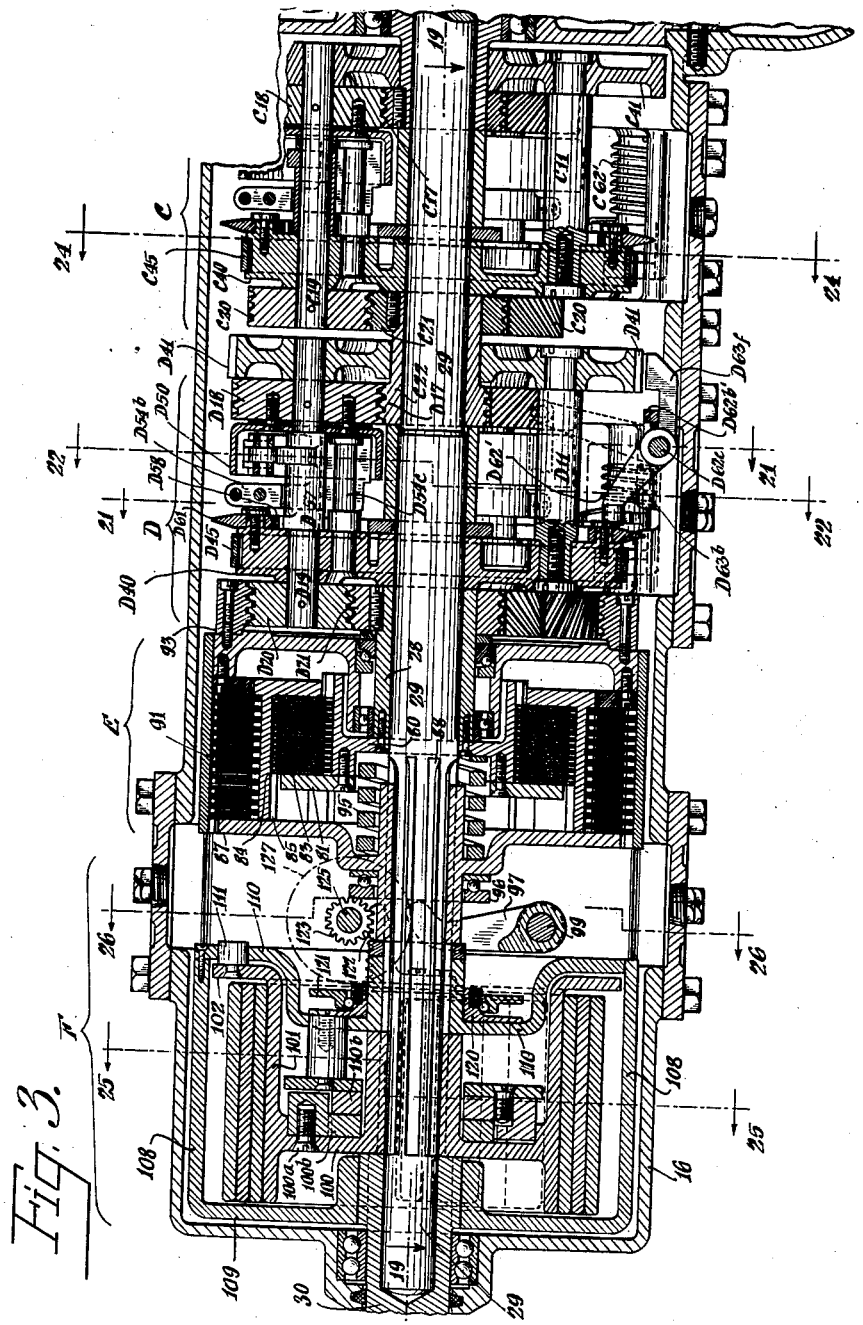

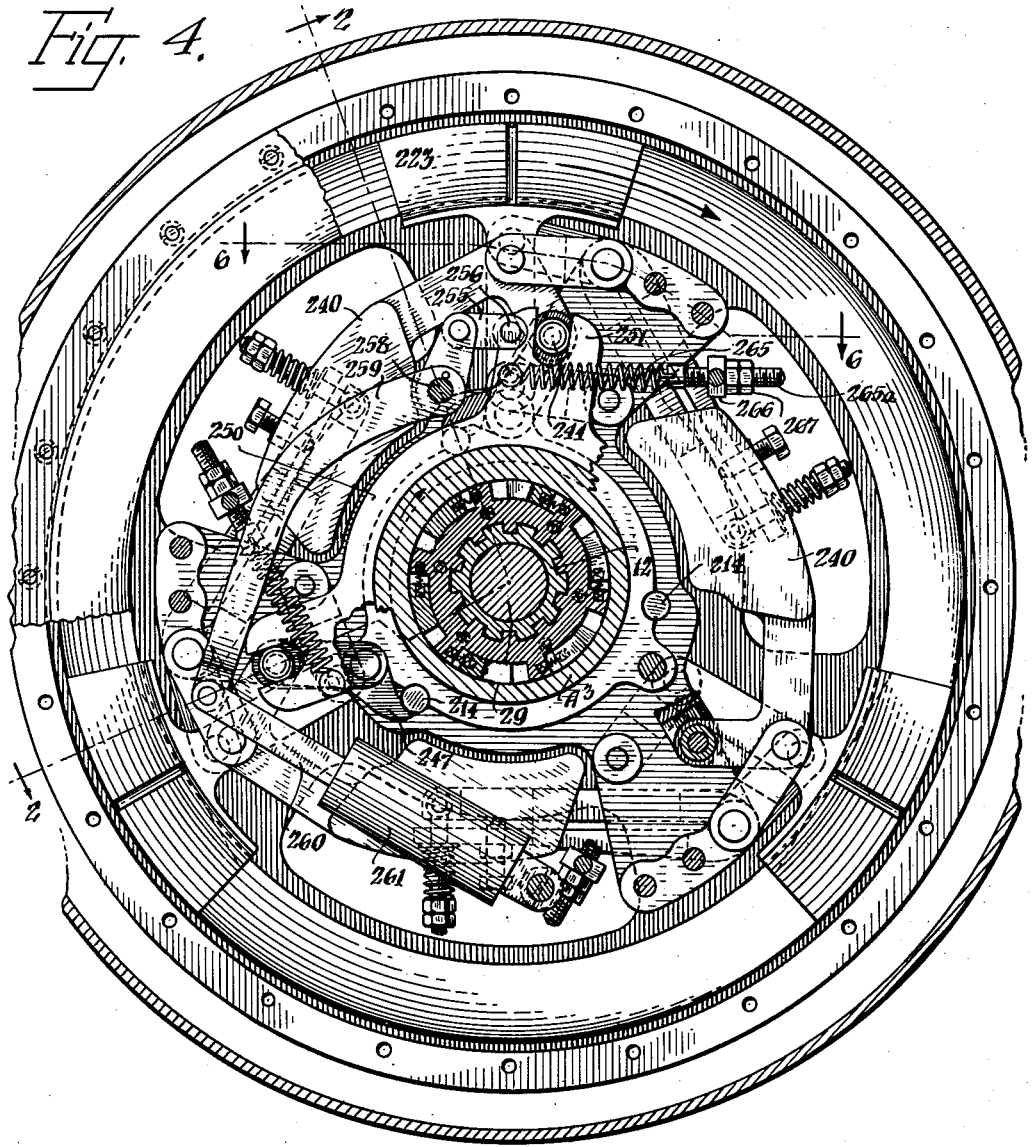
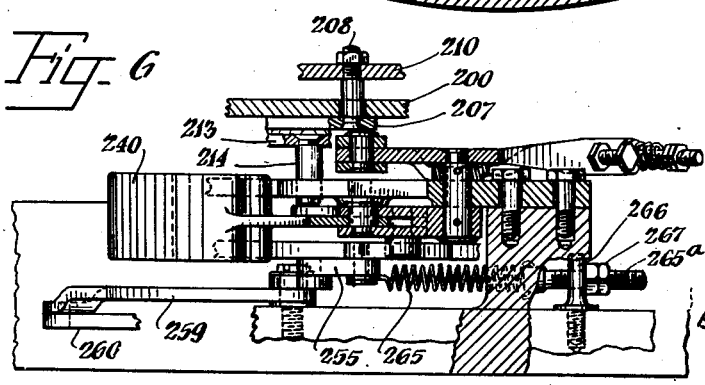

INVENTOR
William S. Gubelmann
By A. A. Hicke
ATTORNEY

April 28, 1953  W. S. GUBELMANN  2,636,401
AUTOMATIC CHANGE-SPEED TRANSMISSION
Filed July 8, 1944  20 Sheets-Sheet 6
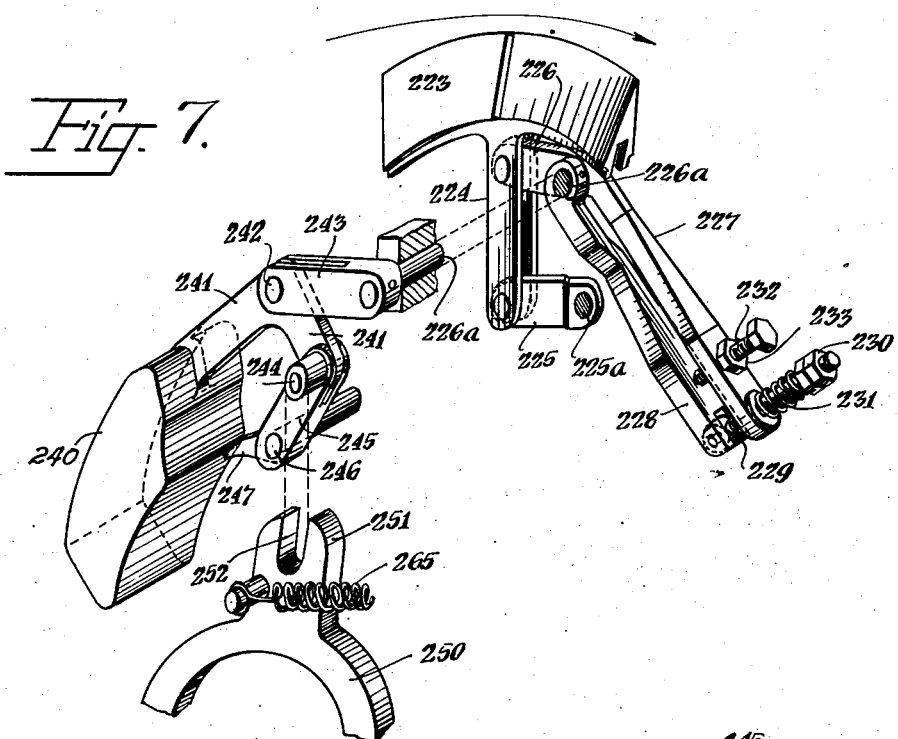
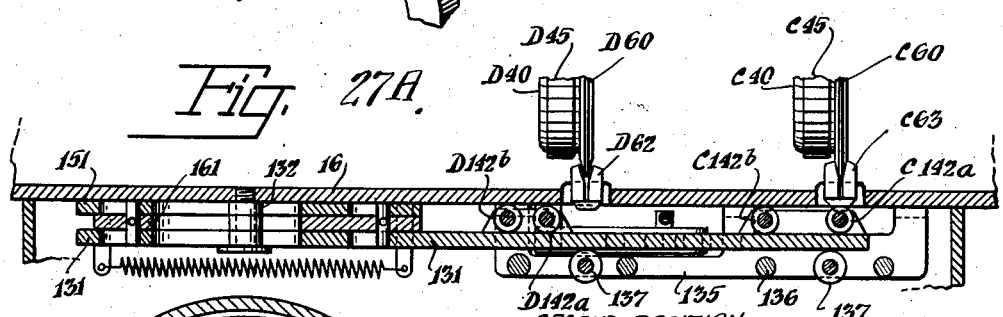
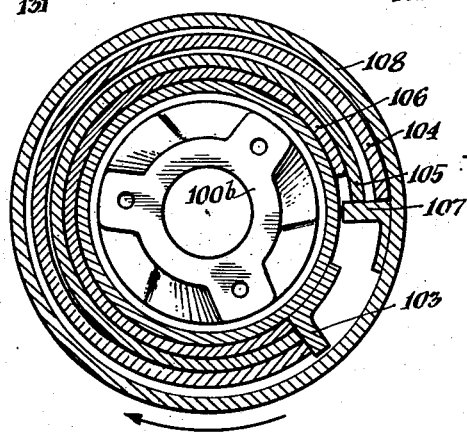
INVENTOR
William S. Gubelmann
By A. A. Hicks
ATTORNEY

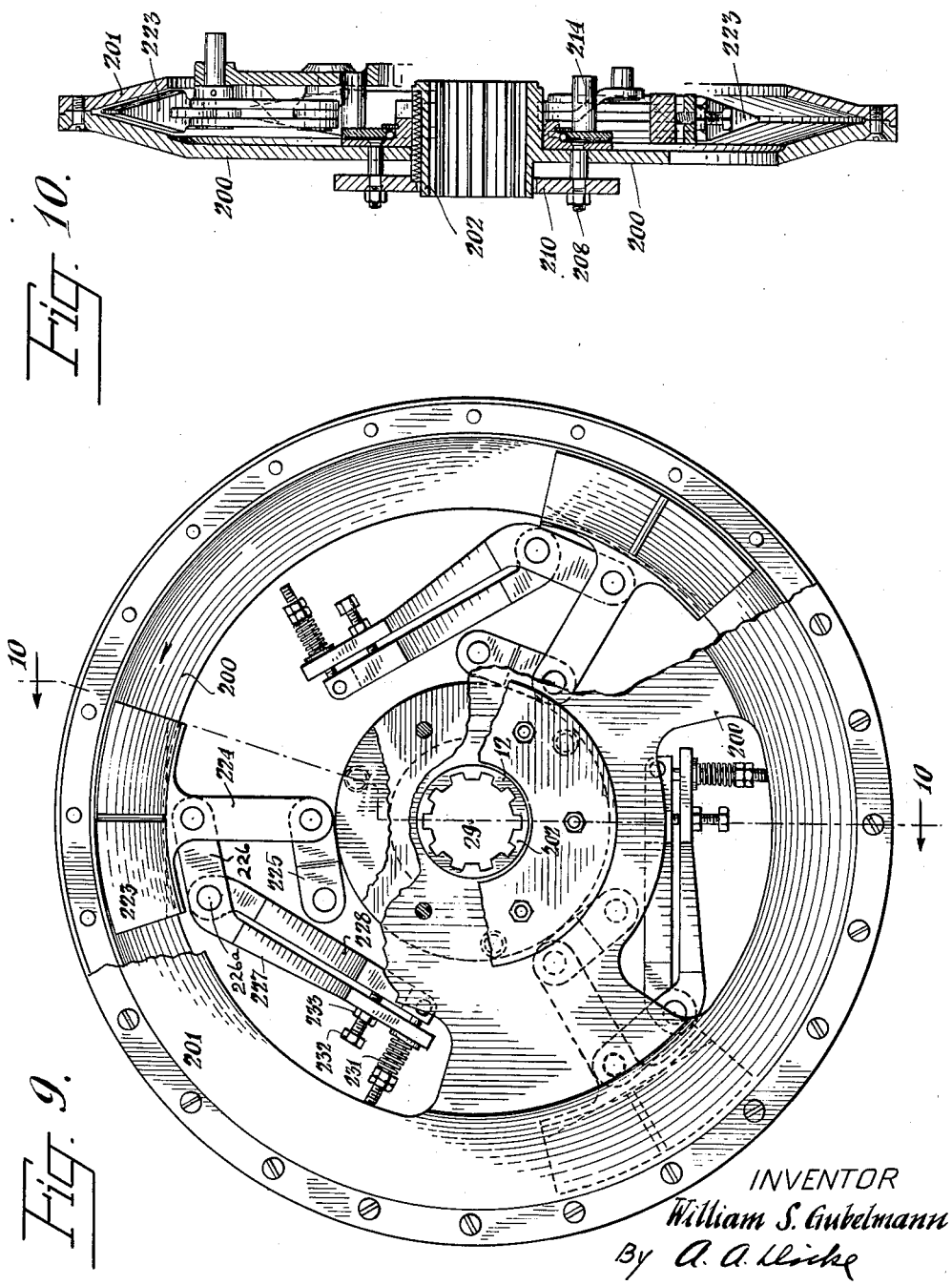

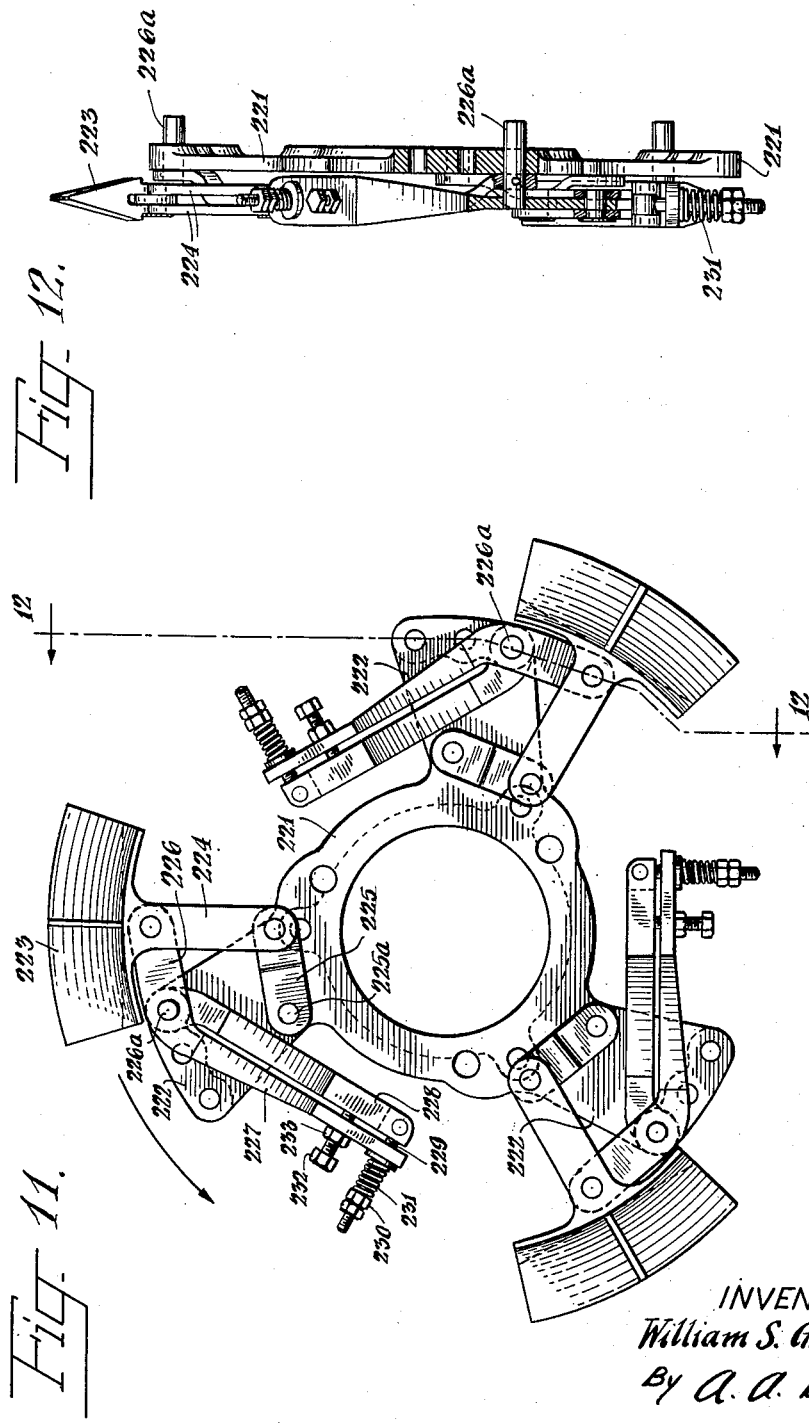

April 28, 1953 W. S. GUBELMANN 2,636,401
AUTOMATIC CHANGE-SPEED TRANSMISSION
Filed July 8, 1944 20 Sheets-Sheet 9

INVENTOR
William S. Gubelmann
By A. A. Klicke
ATTORNEY

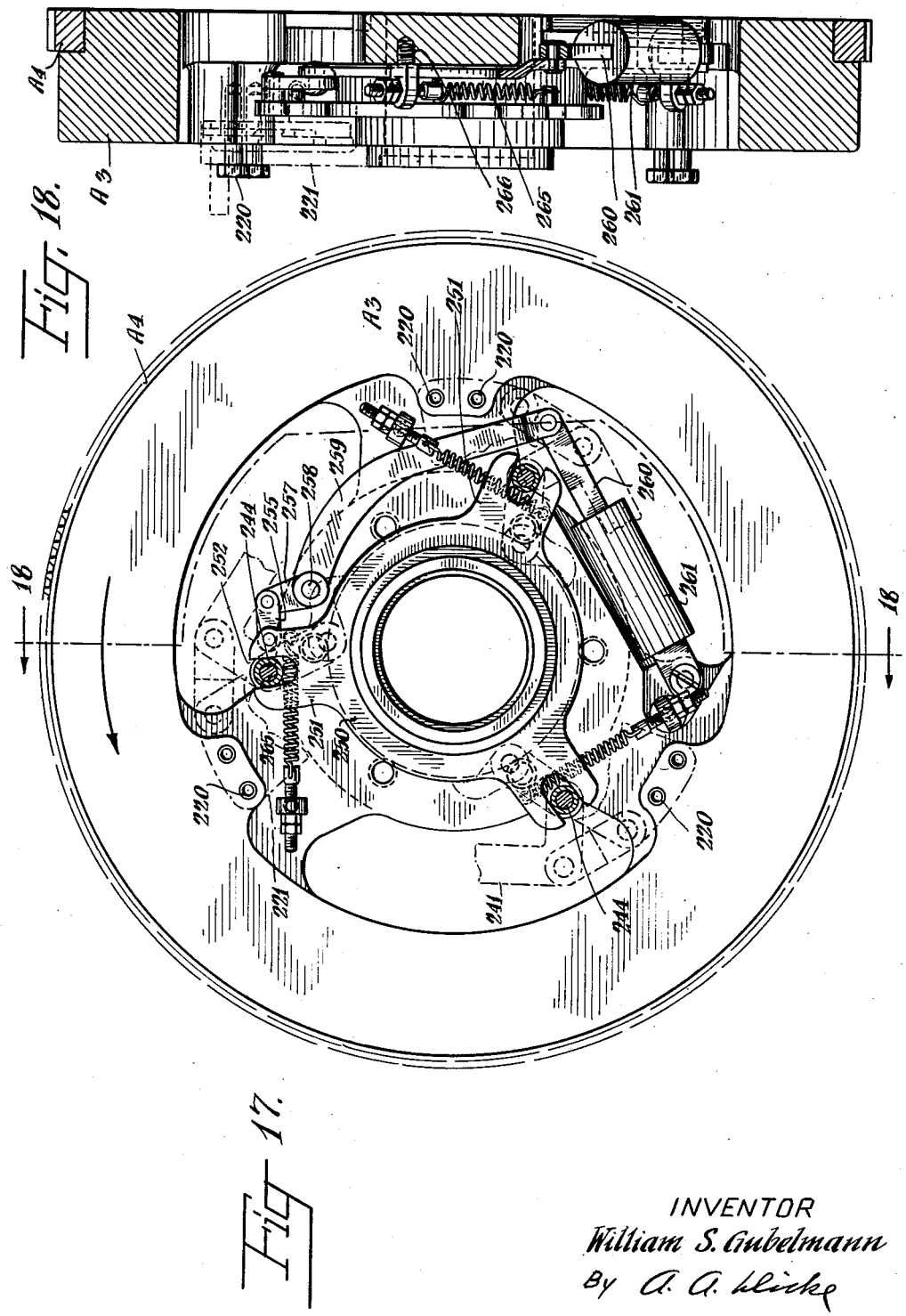

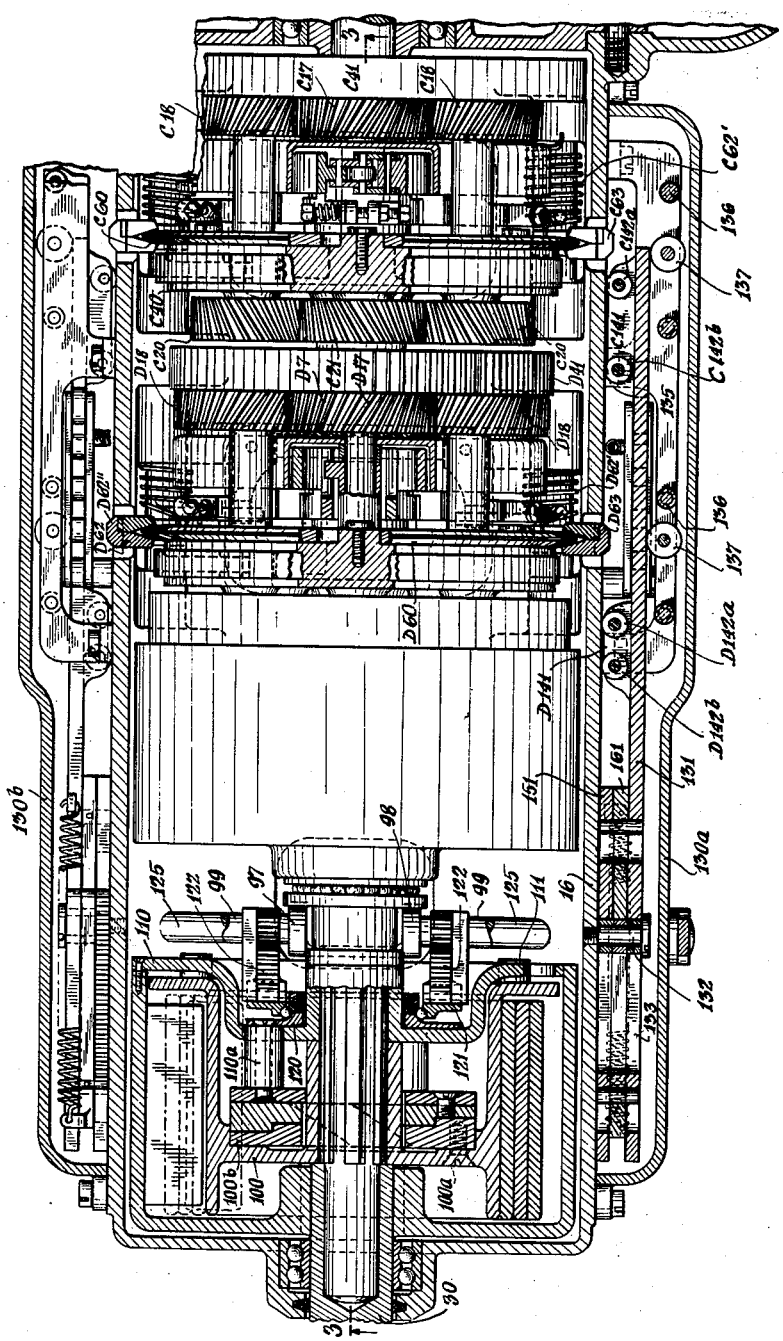

April 28, 1953 W. S. GUBELMANN 2,636,401
AUTOMATIC CHANGE-SPEED TRANSMISSION
Filed July 8, 1944 20 Sheets-Sheet 12
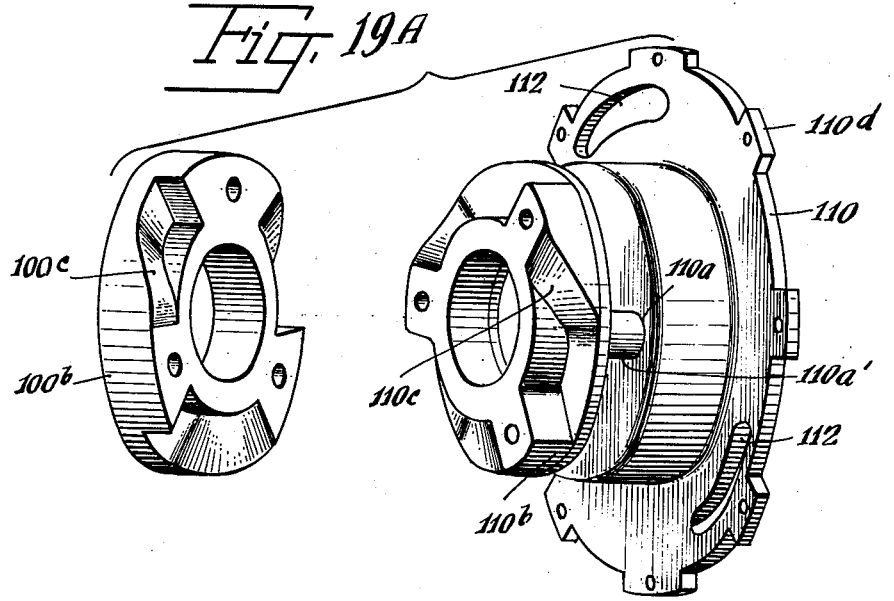
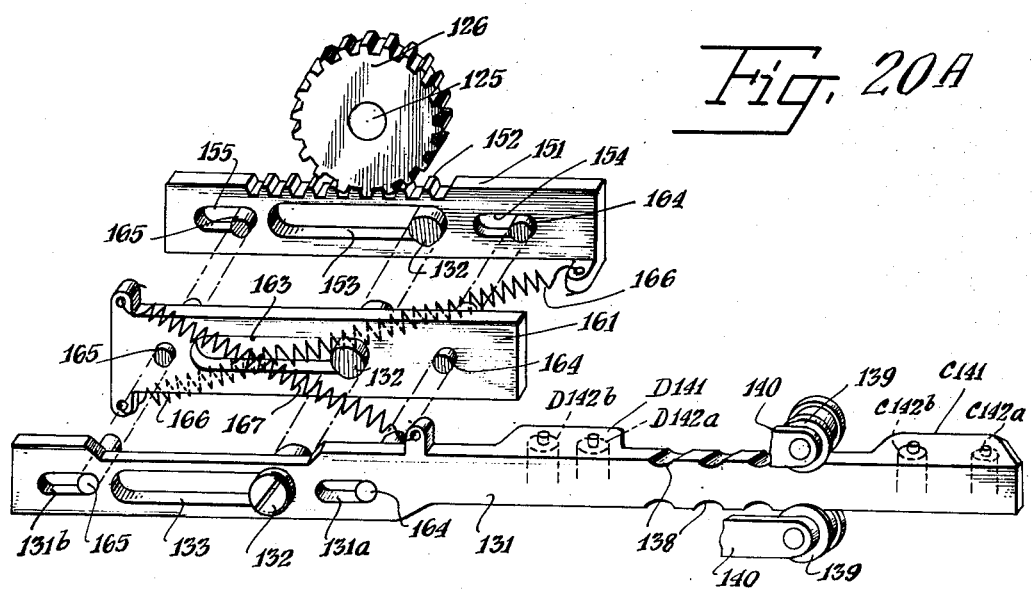
INVENTOR.
William S. Gubelmann
BY
ATTORNEY

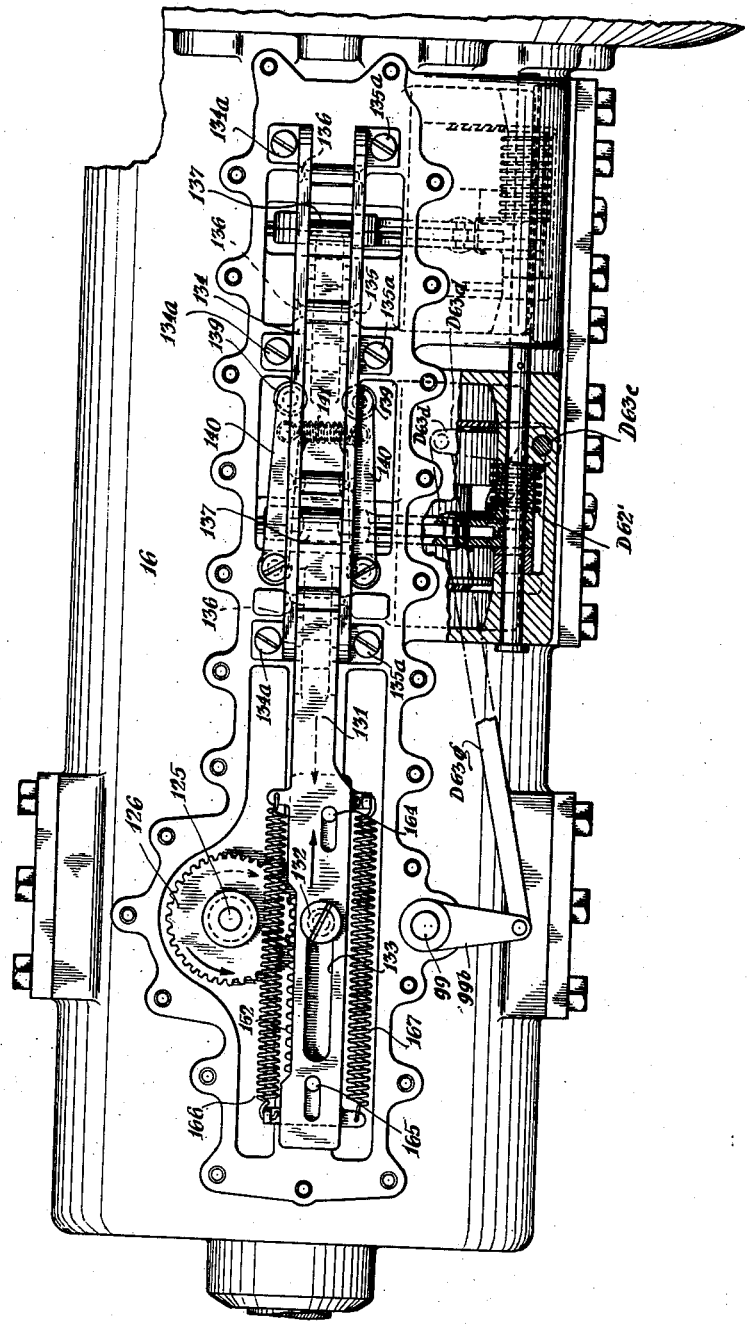

April 28, 1953 W. S. GUBELMANN 2,636,401
AUTOMATIC CHANGE-SPEED TRANSMISSION
Filed July 8, 1944 20 Sheets-Sheet 14

INVENTOR
William S. Gubelmann
By A. A. Wicks
ATTORNEY

April 28, 1953 W. S. GUBELMANN 2,636,401
AUTOMATIC CHANGE-SPEED TRANSMISSION
Filed July 8, 1944 20 Sheets-Sheet 15

INVENTOR.
William S. Gubelmann
By A. A. Ulicke
ATTORNEY

April 28, 1953    W. S. GUBELMANN    2,636,401
AUTOMATIC CHANGE-SPEED TRANSMISSION
Filed July 8, 1944    20 Sheets-Sheet 16

INVENTOR
William S. Gubelmann
By A. A. Klinke
ATTORNEY

April 28, 1953 W. S. GUBELMANN 2,636,401
AUTOMATIC CHANGE-SPEED TRANSMISSION
Filed July 8, 1944 20 Sheets-Sheet 17

INVENTOR
William S. Gubelmann
By A. A. Lücke
ATTORNEY

April 28, 1953 W. S. GUBELMANN 2,636,401
AUTOMATIC CHANGE-SPEED TRANSMISSION
Filed July 8, 1944 20 Sheets-Sheet 18
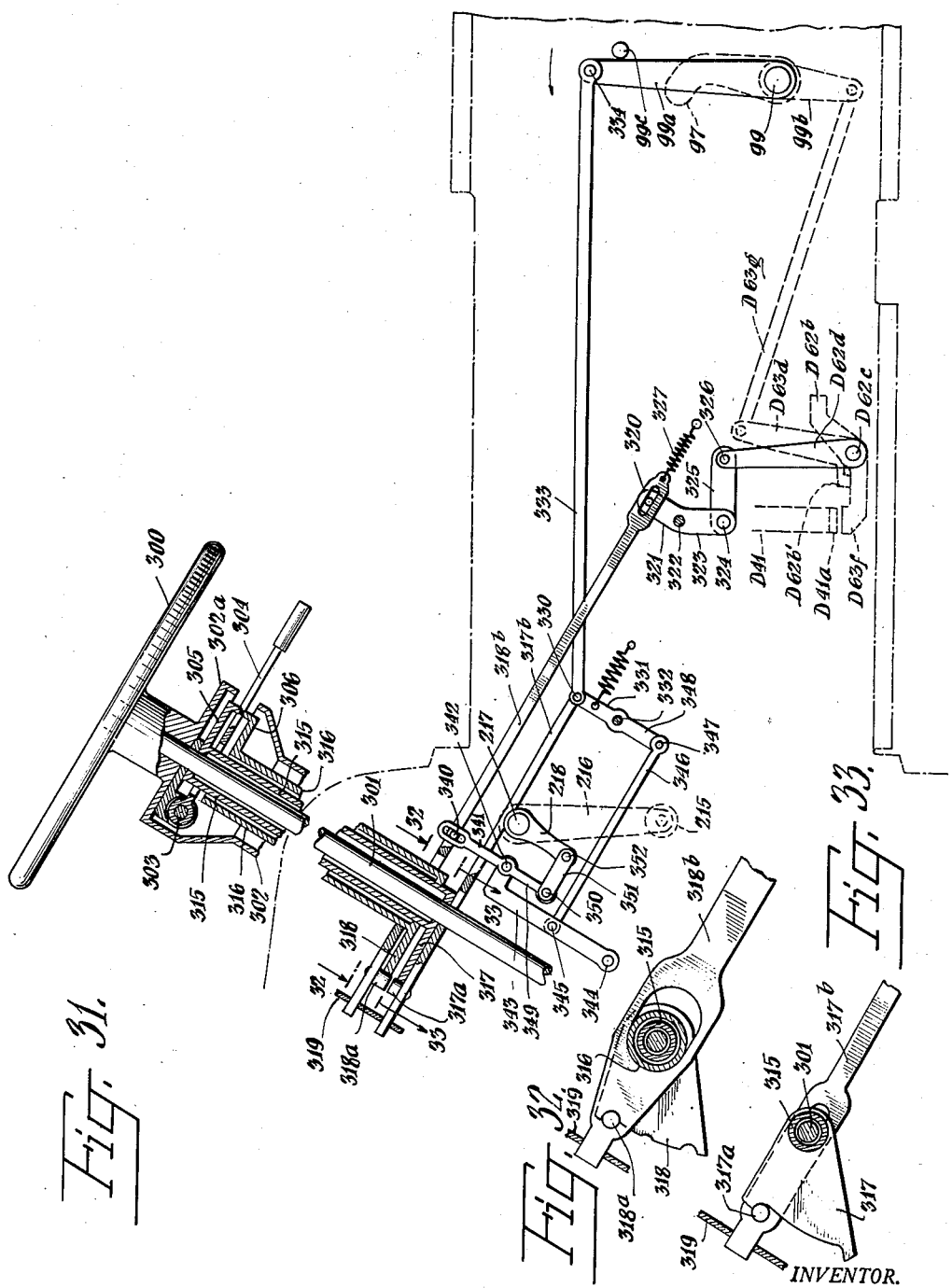
INVENTOR.
William S. Gubelmann
BY
A. A. Klinke
ATTORNEY

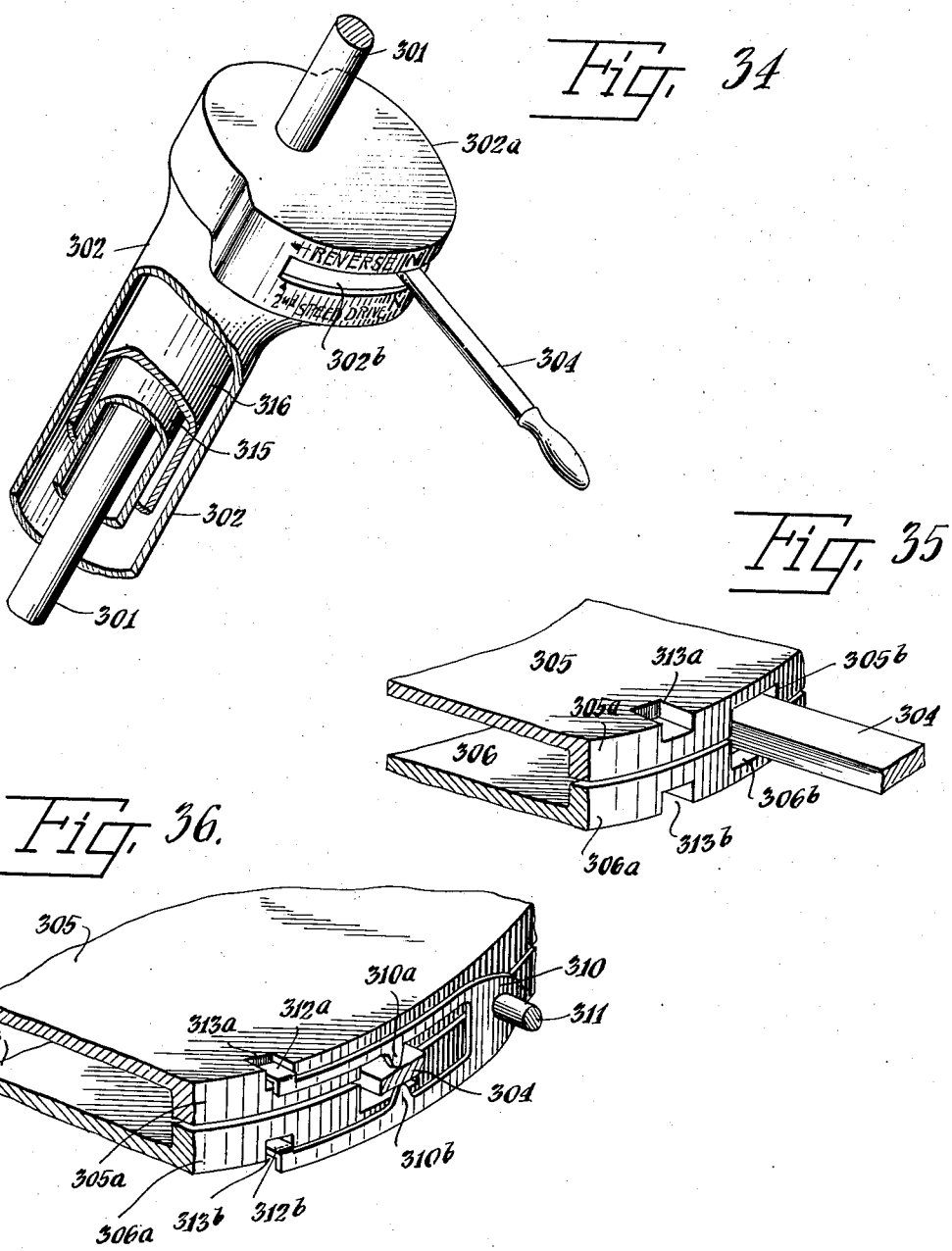

Patented Apr. 28, 1953

UNITED STATES PATENT OFFICE 2,636,401

AUTOMATIC CHANGE-SPEED TRANSMISSION

William S. Gubelmann, Convent, N. J.

Application July 8, 1944, Serial No. 544,030

57 Claims. (Cl. 74—752)

This invention relates to an automatic change-speed transmission, particularly a transmission adapted for use in automobiles, trucks, etc., although capable of use for other purposes.

It is an object of the invention to provide such a transmission in which torque is applied to an input member, as from the crankshaft of an internal combustion engine, and is transmitted through an output member to the driving wheels of a vehicle or to any other power utilizing device, change-speed mechanism being provided between the input and output members, which change-speed mechanism is placed under the control of means including means responsive to the torque applied to the output shaft.

Another object is to provide an improved clutch between the input member (which may be the flywheel of an internal combustion engine) and the speed-change gearing, the effectivity of which clutch is determined by the rotative speed of the input member.

Another object is provide such a speed-responsive clutch provided with manual control means for disabling such speed-responsive clutch-engaging means.

Another object is provide a power transmission comprising a speed-responsive clutch provided with engagement preventing means, and a speed change gearing together with manually adjustable control means common to said clutch engagement preventing means and said speed change gearing.

Another object is to provide such a combination of elements so constructed that the control means cannot be adjusted to disable said preventing means when the input speed has reached a certain magnitude.

Another object is to provide such a combination of elements so constructed that when the input speed has reached a certain magnitude and the clutch is engaged, the control means cannot be adjusted until the input speed has been reduced to a point where the speed responsive clutch has become disengaged.

Another object is to arrange in tandem two speed-reduction or back gear mechanisms having different gear ratios, together with means for making either or both of said back gear means effective, whereby three gear reduction ratios are provided and when neither back gear reduction means is effective a direct drive is effected, providing a fourth speed.

Another object is to provide a plurality of speed-reduction or back gear mechanisms having different gear ratios, together with means for making neither, either or a plurality of said back gear means effective, whereby a larger plurality of gear reduction ratios are provided and when neither back gear reduction means is effective a direct drive is effected.

Another object is to provide a spring connection between the speed reduction mechanism and the output member so arranged as to yield in accordance with the torque applied to the output member together with means for measuring the amount of yield, which measuring means serves to determine the effectivity of the gear reduction mechanism.

Another object is to provide a torque responsive means for controlling gear reduction mechanism, so arranged that when the torque reaches a certain magnitude a higher gear reduction is made effective but that thereafter a predetermined but substantial reduction of torque must occur before the original gear ratio is again made effective.

Another object is to provide spring means between the output member and a member by which it is driven, which spring means are progressively effective with variation in torque, whereby relative motion between the output means and its driver is permitted, and means operated by such relative motion arranged to vary the effectiveness of the gear reduction means.

Another object is to provide in a power transmission, an input member, an output member, and connections therebetween comprising coaxial input and output gears connected for operation with said input and output members respectively, as by a countershaft having gears thereon meshing respectively with said first-mentioned gears, support means for said countershaft rotatable around the axis of said coaxial gears, means operative at times to prevent such rotation of the support means, said gears being of such relative size that the input gear causes the output gear to rotate at a different speed when the countershaft does not revolve, and means for arresting rotation of said countershaft on its axis and simultaneously permitting said support and said countershaft to revolve around the axis of said input and output gears, whereby said input gear causes said output gear to rotate at the same speed as the input gear.

Another object is to provide two such power transmissions arranged in series so that the output gear of the first transmission is connected to for driving the input gear of the second transmission, the gear ratio of the two transmissions being different, together with means for making neither, either, or both said transmissions effective to provide speed change whereby four different speed ratios are provided.

Another object is to provide improved reversing gear means utilizing in part some of the gear reduction means referred to above.

Further objects and advantages of this invention will be apparent from consideration of the specification as illustrated by the accompanying drawings of an illustrative embodiment of the invention, in which drawings:

Fig. 1 is a vertical longitudinal cross-section of an illustrative embodiment of the invention;

Fig. 2 is a fragmentary longitudinal section of the forward end of the transmission on an enlarged scale, taken along the line 2—2 of Fig. 4;

Fig. 3 is a longitudinal cross-section of the transmission aft of the main drive clutch, taken along the line 3—3 of Fig. 19;

Fig. 4 is a transverse cross-section of the speed-responsive clutch mechanism taken along the line 4—4 of Fig. 2, looking aft, the clutch being shown in the disengaged position;

Fig. 6 is a horizontal cross-sectional view of the part of the clutch mechanism taken along the line 6—6 of Fig. 4, the clutch parts being shown in the disengaged position;

Fig. 7 is an expanded perspective view of a part of the clutch mechanism, the clutch being in ineffective position;

Fig. 8 is an expanded perspective view showing one-way-drive clutch parts;

Fig. 9 is an elevation of some of the parts of the speed-responsive clutch mechanism, looking forward, the clutch being in ineffective position;

Fig. 10 is a cross-section taken on the line 10—10 of Fig. 9;

Fig. 11 is an elevation of some of the parts of the speed-responsive clutch mechanism, the clutch being in ineffective position;

Fig. 12 is a cross-sectional view taken along the line 12—12 of Fig. 11;

Fig. 17 is another elevation of some of the parts of the speed-responsive clutch mechanism (looking forward) in ineffective position;

Fig. 18 is a cross-sectional view taken along the line 18—18 of Fig. 17;

Fig. 19 is a horizontal longitudinal cross-section of the rear portion of the transmission taken along the line 19—19 of Fig. 3, looking forward, some of the parts being shown in full, the section being further identified by the line 19—19 of Fig. 26;

Fig. 19A is an expanded perspective view of the cams for controlling the effectivity of the gear reduction mechanism under control of output torque;

Fig. 20 is a side elevation of the transmission showing certain parts broken away;

Fig. 20A is an expanded perspective of slides controlled by torque-responsive means, which, in turn, determine the effectivity of the gear reduction mechanism;

Fig. 27 is a fragmentary transverse vertical cross-section similar to certain parts shown in Fig. 25 with the parts in position causing the forward gear reduction mechanism to be effective;

Fig. 27A is a fragmentary longitudinal horizontal cross-section of the speed-reduction gear controlling mechanism in a position corresponding to Fig. 27;

Fig. 31 is a side view of the left side of the parts being shown in cross-section;

Fig. 32 is a fragmentary sectional view taken along the line 32—32 of Fig. 31;

Fig. 33 is a similar view taken along the line 33—33 of Fig. 31;

Fig. 34 is a perspective view, partly broken away, of the manual control means located near the top of the steering column;

Fig. 35 is a fragmentary perspective of certain control means mounted near the top of the steering column;

Fig. 36 is a view similar to Fig. 35, showing interlock means for the control means;

Figure 37:
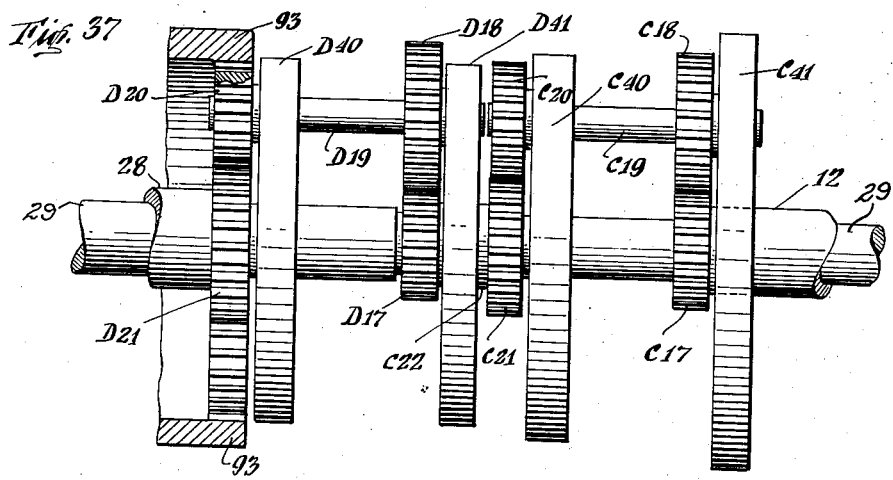
Fig. 37 is a more or less schematic view of certain parts of the transmission mechanism shown more particularly in Figs. 1, 3, and other figures.

Referring to the drawings (Figs. 1, 3, and 37), A refers generally to the power input means which may consist of the crankshaft A1 of an internal combustion engine formed with a flange A2 to which is shown bolted a flywheel A3 which may have a starter ring gear A4. B indicates generally a clutch which may be engaged when the power input member is rotated at a certain speed. A further description of said clutch will be given later.

That portion of the transmission designated C is the front gear reduction mechanism, whereas D designates generally the rear gear reduction mechanism. E designates generally mechanism for causing forward or reverse motion of the output member and F designates generally torque responsive means which serve to determine the effectivity of the gear mechanisms C and D.

29 indicates a shaft which extends the entire length of the transmission, its rear half being preferably of greater diameter as shown. When clutch B is effective, and the gear mechanisms C and D are set to cause direct drive, and the reversing mechanism is not effective, shaft 29 rotates at crankshaft speed and in the same direction. At its forward end it is surrounded by a sleeve 12 rotatable thereon which sleeve is journaled through ball bearing 13 in a plate 14 bolted as at 15 to the housing 16 which housing serves to enclose the flywheel, the clutch B, the gear reduction mechanisms C and D, the reverse mechanism E, and the torque responsive means F. The said sleeve 12 carries for rotation therewith a pinion C17 which meshes with one or more gears C18, three being shown.

The gear C18 is carried on a countershaft C19 which, in turn, carries a gear C20, shown as somewhat smaller than the gear C18. The gear C20, in turn, meshes with a gear C21 which is carried by the sleeve C22 rotatable upon the shaft 29, and carries a pinion D17 meshing with a larger gear D18 attached to countershaft D19 which also carries gear D20 which meshes with gear D21 on sleeve 28, which sleeve is journaled upon the shaft 29 co-axial with the output shaft 30.

Figures 21, 30:
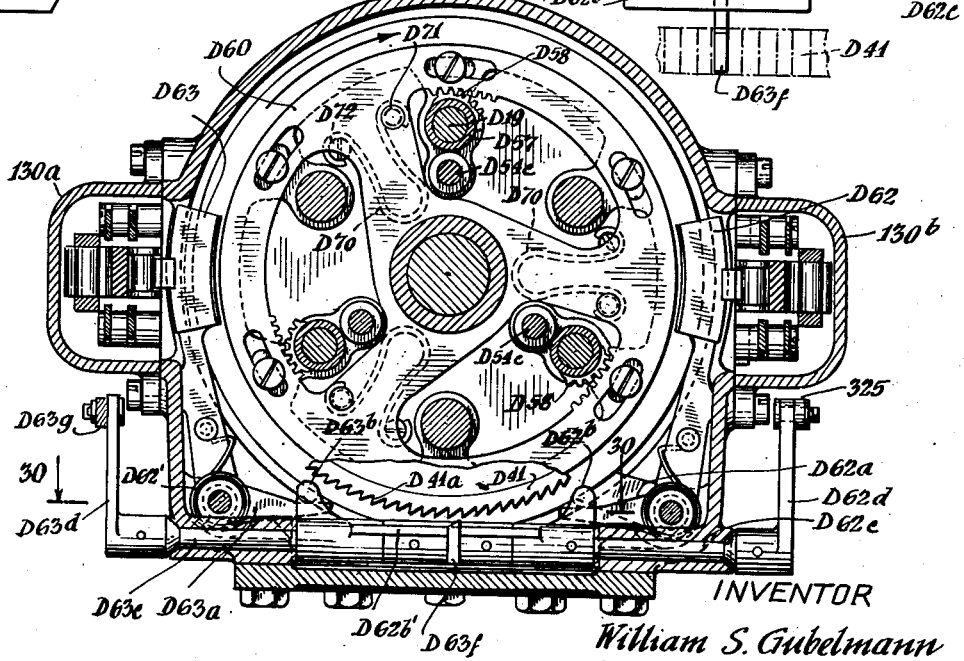
Fig. 21 is a transverse cross-section taken along the line 21—21 of Fig. 3, looking aft.
Fig. 30 is a fragmentary horizontal cross-sectional view taken along the line 30—30 of Fig. 21.
Figure 24:
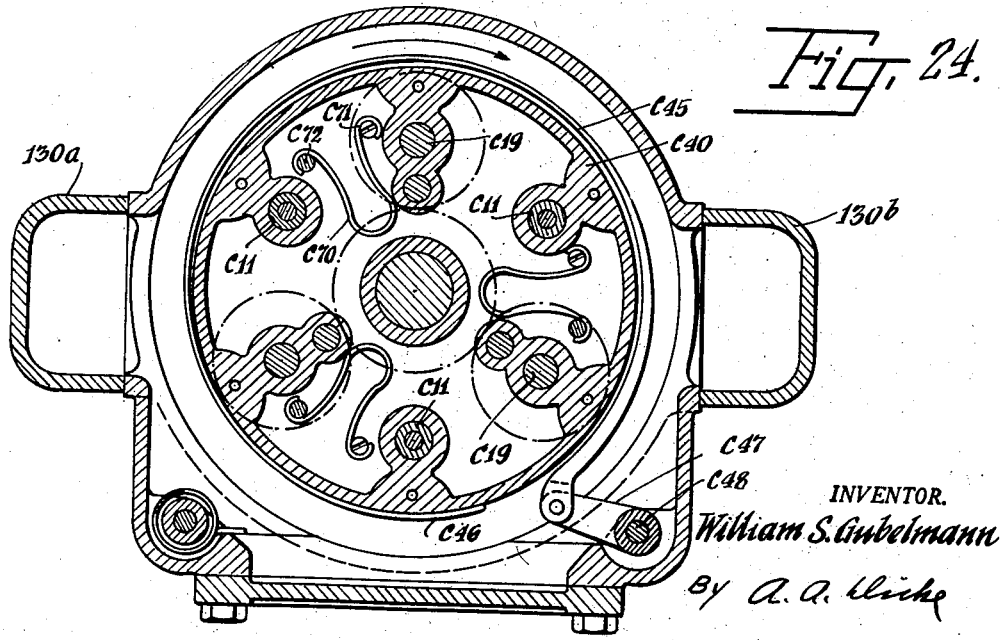
Fig. 24 is a transverse cross-section taken along the line 24—24 of Fig. 3, looking aft.

One end of each of the countershafts C19 are journaled in a disk or other circular member C40 mounted for rotation upon shaft 29 and preferably having the form shown in Figs. 3, 21, and 24 and their other ends are journaled in a disk or similar member C41 mounted for rotation on sleeve 12. Said disks are firmly connected together as by three rods C11 (see Figs. 3 and 24) held in place by screws, as shown. The disks C40, C41, and rods C11 form a cage which serves as a carrier for the countershafts C19, or other speed change gear means.

Similarly, countershafts D19 are carried by a similar cage comprising disk D40, mounted for rotation on shaft 29, and disk D41, mounted for rotation on sleeve C22 fastened together by rods D11.

The gears comprising the gear reduction means C are preferably so selected as to provide a speed reduction of say 1.5 to 1, whereas gear reduction means D provide a gear reduction of say 2.1 to 1. As they are arranged in series, it is clear that when both are effective, they will provide an over-all gear reduction of 1.5×2.1=3.15 to 1. The over-all gear reduction, as well as the intermediate gear reduction, ratios can of course be made whatever is desired.

An understanding of the gearing element described above may be facilitated by reference to Fig. 37 which shows the construction more or less schematically. Said figure shows only those elements which are directly involved as gear elements.

Figure 38:
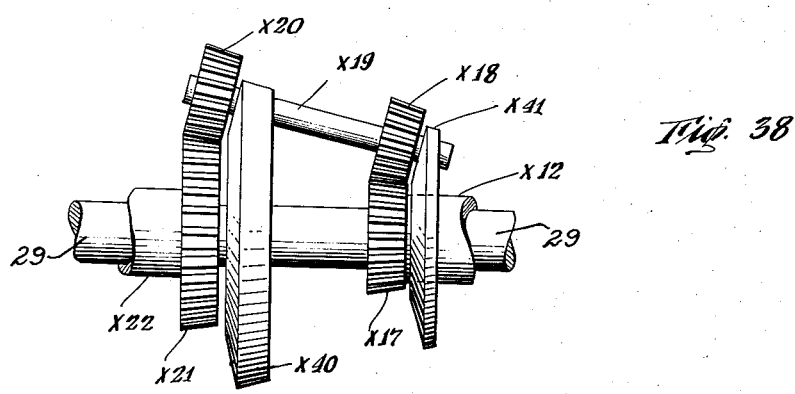
Fig. 38 is a schematic view of a modified form of transmission gearing.

It is, of course, to be understood that the members C18, C19, and C20 (or D18, D19, and D20) need not be in the form of separate gears attached to a countershaft. For example, they may be integrally formed gears with any suitable journals therefor. Furthermore, their axes need not be parallel to that of shaft 19. Such a modification is disclosed in Fig. 38 wherein the gears X17 and X18 which correspond to gears C17 and C18 or D17 and D18 are bevel gears. Similarly, the gear pair X20 and X21 which correspond to C20 and C21 or D20 and D21 are a bevel gear pair.

Figure 39:
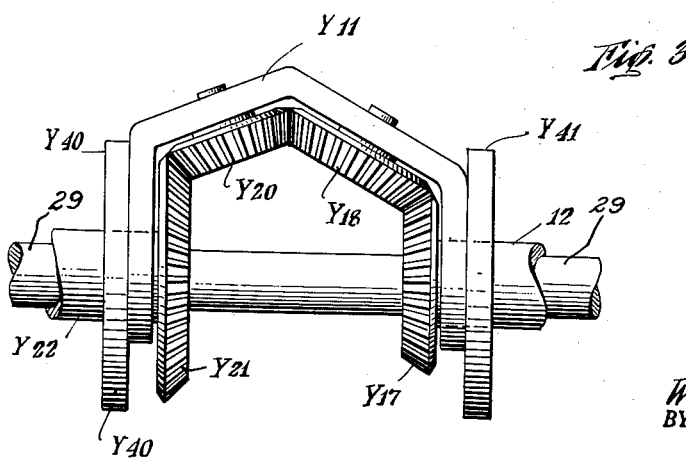
Fig. 39 is a schematic view of another modified form of gearing.

All that is required is a speed-change gearing between members such as sleeve 12 and sleeve C22 which causes the latter to rotate in the same direction but at a different speed from that of the former. This may be accomplished also by other gearing such as that shown in Fig. 39. In said modification a bevel gear Y17 is secured to sleeve 12 and a bevel gear Y21 is secured to sleeve Y22 corresponding to sleeve C22 or D22. These two bevel gears are shown connected by means of idler bevel gears Y18 and Y20. The latter bevel gears are supported for rotation about their own axes on any suitable journals and for revolution about the axis of shaft 19 by means of a yoke Y11 mounted for rotation about the axis of shaft 19. Said yoke may have secured to it a disk Y41 corresponding in function to the disk C41 or D41 and also a disk Y40 corresponding in function to the disk C40 or D40.

In the form shown, the engine or other power input member is assumed to rotate right hand, i. e., clockwise when viewed from front toward the rear. It is obvious that in the absence of something to prevent it, the right hand rotation of the sleeve 12 will tend to cause the cage formed by disks C41 and C40 and rods C11 of the forward gear reduction mechanism, as well as the cage formed by disks D41 and D40 and rods D11 of the rear gear reduction mechanism, to rotate in a counterclockwise direction, causing the gears C18, C20, D18, and D20 to planetate idly around their respective gears. Such counterclockwise rotation as would otherwise occur is however prevented by means of a one-way brake mechanism which, in the form shown, comprises a C-shaped brake spring C45 on the disk C40 and a similar brake spring D45 on the disk D40. As shown in Fig. 24, the band brake C45 bears at its free end, designated C46, in the groove in disk C40, and the other end is pivotally connected to an arm C47 pivoted at C48. It will be noted that the brake spring C45 does not interfere with the clockwise rotation of the disk C40 (as viewed in Fig. 24) but that upon the occurrence of counter-clockwise rotation the arm C47 will swing in, clockwise, about pivot C48, causing the brake spring C45 to clamp upon the periphery of disk C40 and prevent its counter-clockwise rotation (as viewed in Fig. 24). The parts C45 to C48 therefore serve as an abutment for the reaction forces always present where a gear reduction is effected. A similar construction is provided for the second reduction gear mechanism.

It is, of course, to be understood that any other known or suitable one-way brake or other arresting mechanism which serves to prevent reverse rotation of the cages may be employed.

It will be seen that if the shafts C19 are not prevented from rotating freely on their axes the gear reduction means are effective to cause gear reduction and torque multiplication, depending in amount upon the relative diameters of gears C17, C18, C20, and C21. (The same applies to the rear reduction gear mechanism D.)

In order to make the respective gear reduction means ineffective, viz., to cause direct transmission through the respective gear reduction means, brake means are provided to prevent rotation of the shafts C19 on their axes and/or D19. Referring particularly to Figs. 1, 3, 21, 22, and 23, this braking mechanism will be described with particular reference to the rear gear reduction mechanism D, it being understood that the forward gear reduction mechanism has substantially similar parts which are correspondingly numbered except that they are given the prefix "C" instead of the prefix "D." Firmly attached to the gears D18 (see Fig. 3) are brake drums D50 within which are housed expanding brake shoes D51 which are at will expanded to effective position by means of the toggle links D52 which are at times forced out to brake-applying position by means of a cam D53. The other ends of said brake shoes bear against abutment shoes D54, the position of which is adjustable by means of adjusting screws D55 and D56 (Figs. 22 and 23) which are carried by arms D54a and D54b attached to said abutment shoes. Said arms bear against the rod D54c which is carried by disk D40 (see Fig. 3). Screw D56 is surrounded by compression spring D56a which is biased to press the arms together and spread the abutment shoes D54 to an extent determined by screw D55. This provides adjustment of the brake shoes as to position (clearance space) and also the amount of pressure when the shoes are effective.

Mounted upon shaft D19 is a sleeve D57 (Figs. 1, 3, 21, 22, and 23) upon which is formed the said cam D53. At its other end said sleeve is formed with a gear segment D58 which engages with annular gear segment D59 formed on a spider D60 which is formed with a conical edge portion D61 which may at times be engaged by brake shoes D62 and D63. The spider D60 is rotatably mounted on shaft 29 and lies against disk D40. Its rotation relative to disk D40 is limited by means of lugs D64 formed on disk D40 passing through slots D65 in the spider. Heads of screws D64a threaded into the lugs D64 hold the parts in position. U-shaped springs D70 (Figs. 21, 23, and 24) are interposed between stud D71 on the spider D60 and stud D72 on the disk D40, said springs being so biased as to normally tend to move the spider D60 clockwise (as viewed in Figs. 21 and 22); (counter-clockwise as viewed in Fig. 23).

Figure 23:
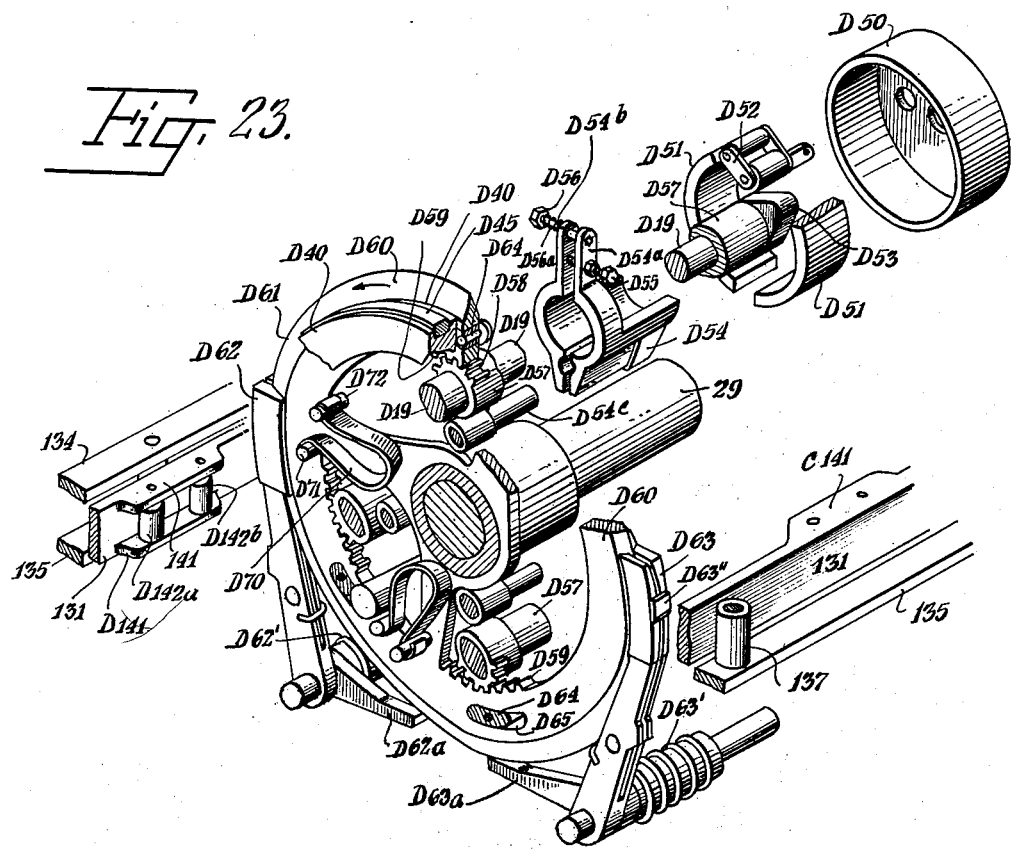
Fig. 23 is an expanded perspective view of certain parts of one of the reduction gear mechanisms, the back gearing being free so that gear reduction is effected.

In Fig. 23, the brake shoes D62 and D63 are shown as applied against the bias of coil springs D62' and D63'. As the rotation is counter-clockwise, as viewed in Fig. 23, the spider D60, having been arrested, has moved clockwise relative to the disk D40 and shaft D19 and therefore gear segment D58 has been rotated clockwise, turning with it sleeve D57 and cam D53 (which is now in the ineffective position shown in Fig. 23). The brake shoes D51 are therefore not applied to the brake drum D50, shaft D19, and the gears D18 and D20, are therefore free to rotate upon their axes, causing a gear reduction to be effected through gears D17, D18, D20, and D21. The cage formed by disks D40 and D41 and rods D11 is prevented from rotating backward by the brake spring D45 or other suitable means for preventing reverse rotation.

If now the brake shoes D62 and D63 are released, the U springs D70 will spread, causing the spider D60 to move counter-clockwise relative to disk D40 (Fig. 23), causing gear segments D58, sleeve D57, and cam D53 to move counter-clockwise, thus causing the toggle links D52 to straighten and to apply brake shoes D51 to the brake drum D50. Rotation of shaft D19 is therefore arrested. Consequently, gear D17 must rotate at the same speed as gear D21 and the cage which carries shaft D19 rotates in a forward direction. Therefore no gear reduction is now effected.

The parts of the first gear reduction mechanism, generally designated "C," operate in the same manner. It will therefore be seen that if a brake is applied to spider C60 and not to D60, a gear reduction of say 1.5 to 1 will be secured. If the brake shoes are applied to spider D60 and not to spider C60, a gear reduction of say 2.1 to 1 will be secured. Furthermore, if the brake shoes are applied to both spiders C60 and D60, a gear reduction of 3.15 to 1 will be secured. The means for selectively applying the brake shoes D62 and D63 to disk D60 (and the corresponding brake shoes C62 and C63 to spider C60) will be described later.

It will be noted that the gear reduction mechanisms C and D each comprises a power transmission. Thus the gear C17 is the power input gear for transmission C and gear C21 its output gear which is connected to for driving the input gear D17 for the power transmission D whose output gear (except during reverse) is the gear D21.

It will be noted that the brake shoes D62 and D63 (and the corresponding brake shoes C62 and C63 of the transmission C) are shown split to permit spreading if necessary. This is desirable as it permits a smoother application of the brakes and avoids the necessity of close tolerances in the manufacture of the various parts as well as providing compensation for wear. This construction together with the conical formation of the periphery of disks D60 and C60 causes the brake shoes to spread if they are applied too hard. The bridge member D63'', attached only to one of the split portions, is provided as an abutment against which the brake operating rollers, described hereinafter, may bear. The other brake shoes are provided with similar bridge members D62'', C62'', and C63''.

Figure 22:
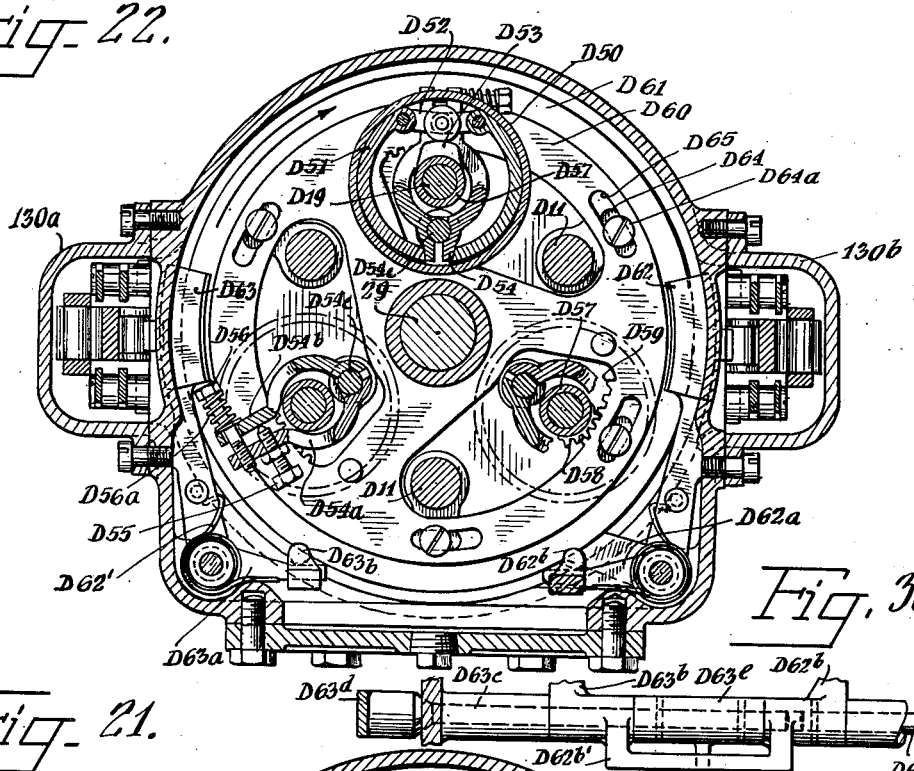
Fig. 22 is a transverse cross-section taken along the line 22—22 of Fig. 3, looking aft, the parts being in position to lock the back gearing so that no gear reduction is effective.

Referring to Figs. 21, 22, and 23, it will be noted that the brake arms D62 and D63 are formed with arms D62a and D63a. Cooperating therewith are fingers D62b and D63b mounted for rotation with a transverse shaft D62c extending from the port side of the transmission and carrying an arm D62d.

The fingers D62b and D63b are connected by a bail D62b' to cause them to move together (see Fig. 30). A shaft D63c, provided with an arm D63d on the starboard side of the transmission, provides a journal upon which finger D63b oscillates and it carries near the center of the transmission a sleeve D63e formed with a locking finger D63f which normally underlies the disk D41, the periphery of which is provided with ratchet teeth D41a. As seen in Fig. 21, the ratchet teeth and the locking finger are so arranged that when the locking finger is in its upper (effective) position, it will prevent clockwise rotation of the disk D41 (as viewed toward the rear). This locking function is only effective as an incident to "Reverse" operation of the transmission.

It will be seen that when the upper end of the lever D62d is moved rearwardly (see also Fig. 31), the brake shoes D62 and D63 will be pressed against the spider D60. This is a manually-operable over-riding control for forcing the gear reduction means D to effective position. This is desirable where the vehicle is on a down grade and it is desired to use the engine as a brake. It is also necessary when the reversing mechanism is effective, as will be described later.

Reversing mechanism

Referring to Figs. 1 and 3, it will be noted that the sleeve 28 has secured to it a disk 80 formed with a flange 81 and with splines 82 located in notches in clutch plates 83. Interspersed between said clutch plates 83 are clutch plates 84 which are shown splined at 85 to a sleeve 86 carried by spider 87 concentric with and splined at 88 to the shaft 29.

The periphery of sleeve 86 has splined thereto clutch plates 89 between which are interspersed clutch plates 90 splined to the housing 91. Said housing 91 is carried by a spider 92 which, through ball bearings, is carried by sleeve 28. Said spider 92 carries an annular ring gear 93 which is constantly in mesh with the several gears D20. In normal forward drive, the clutch plates 83, 84, are engaged and the clutch plates 89, 90, are disengaged. Therefore when the gear reduction means D is effective, the ring gear 93 rotates idly in a counter-clockwise direction. However, when the gear reduction means D is ineffective so that it transmits rotation at a 1 to 1 ratio, the ring gear 93 rotates idly at the same speed as gear D21 but in a clockwise direction. It will be readily seen that in order to secure reverse movement, it is merely necessary to disengage the forward drive clutch plates 83, 84 and simultaneously engage the reverse clutch plates 89 and 90. During this time the reduction gearing D must be made effective for reasons and by means which will be made clear hereinafter.

The helical compression spring 95 bears against the disk 80 and the spider 87, tending to separate them and thereby tending to press the clutch plates 83 and 84 together. In this condition of the parts, forward drive occurs since rotation of sleeve 28 will cause rotation of the spider 87 which, being splined to shaft 29, causes forward rotation of said shaft.

Figure 26:
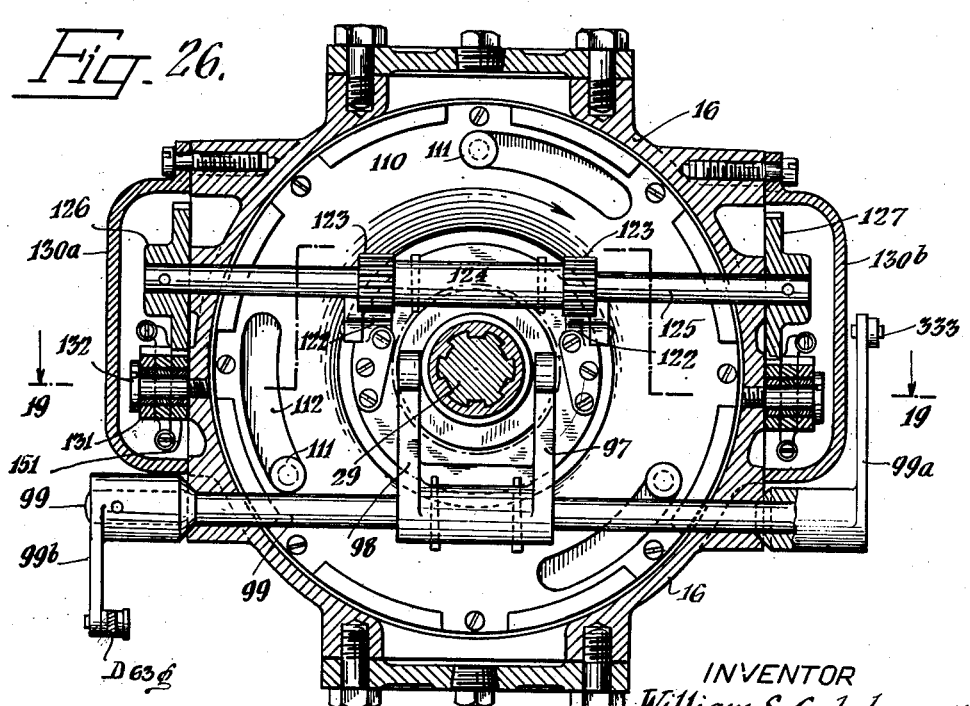
Fig. 26 is a transverse cross-section taken along the line 26—26 of Fig. 3, looking aft, showing part of the torque-responsive means for controlling the effectiveness of the reduction gearing.

To the rear of spider 87 is a thrust bearing 96 against which may bear arms 97 and 98 (see also Figs. 19 and 26), which arms are mounted for rotation with shaft 99 journaled in the housing 16, as shown in Fig. 26. One end of said shaft 99 is formed with a lever 99a (Fig. 31) which may be operated at will by manually-controlled means to be described later. It will be seen that if the upper end of lever 99a is moved forward, the arms 97 and 98 will, through thrust bearing 96, move the spider forwardly against the action of spring 95. This will cause the forward drive clutch plates 83 and 84 to be disengaged and the reverse drive clutch plates 89, 90 to be engaged, resulting in reverse rotation of the spider 87 and therefore of shaft 29 and shaft 30. This reverse drive can only occur when the brake shoes D51 (Fig. 23) are not engaged so that the reduction gearing D is effective. At this time, gear D21 and sleeve 28 will be rotated forwardly (idly) by gear D20; whereas annular ring gear 93 will be rotated reversely by gear D20, driving disk 92, housing 91, disk 87, and shaft 29 reversely.

During this time, gear D17 acting upon gear D18 as well as gear D20 acting upon annular gear 93 will tend to rotate the gear cage comprising disk D40 and D41 in a clockwise direction. If said cage were free to rotate clockwise, there could, of course, be no application of reverse torque to ring gear 93. Means are provided to prevent said clockwise rotation of said cage which is effective only when the transmission is adjusted for reverse. These means are the ratchet teeth D41a on the periphery of disk D41, the locking finger D63f, and the means for operating said locking finger. These operating means consist of the shaft D63c, and the operating arm therefore, D63d. Said arm is operated by means of a link D63g (see Figs. 21 and 31) connected to a downwardly extending arm 99b attached to the starboard end of shaft 99 (see also Fig. 26). It will be seen therefore that when the shaft 99 is rocked (clockwise in Fig. 1; counter-clockwise in Fig. 31), to disengage the forward drive clutch and to engage the reverse drive clutch, the arm 99b acting through link D63g and arm D63d will rotate the shaft D63c and cause the locking finger D63f to be raised to engage the ratchet teeth D41a on the disk D41, thus preventing forward rotation of the cage of which disk D41 forms a part. At the same time, the ball D62b' is lifted by the locking finger D63f, causing the fingers D62b and D63b to rock downwardly, engaging respectively the arms D62a and D63a (Figs. 21 and 23), causing the brake shoes D62 and D63 to be applied and therefore releasing the brake shoe D51. All of said parts are now in condition for causing the transmission to deliver reverse torque.

*Torque-responsive control means*

Splined to the shaft 29 is a member 100 formed with a cylindrical portion 101 having a flange 102 (Figs. 1 and 3). On said flange is formed an abutment lug 103 (Figs. 25, 27, 28, and 29), against which bear 3 "C" springs 104, 105, and 106. The other end of the spring 104 normally bears against an abutment lug 107 against which may bear at times also the ends of springs 105 and 106. The abutment lug 107 is carried on the inner periphery of a housing 108 having a rear wall 109 splined to the output shaft 30 and having a forward wall 110 mounted for free rotation upon shaft 29. It will be noted, however, that this rotation is limited by means of a stud 111 carried by the flange 102 of the cylindrical part 101, which stud plays within the slot 112 on the forward wall 110. As seen in Fig. 18a, the said disk-like forward wall 110 is formed with a series of projections 110d which fit into corresponding recesses in the cylindrical outer wall 108.

It will be seen that all torque between the shaft 29 and the output shaft 30 must be delivered through springs 104, 105, and/or 106. Said springs will be deformed in accordance with said torque and therefore the member 100 will move relative to the members 108, 109, and 110, an amount which is a function of the torque transmitted from shaft 29 to shaft 30. When this torque is at a minimum the parts will be in the position shown in Fig. 25. When the torque is sufficiently increased, the springs will assume the position shown in Fig. 27 where spring 104 has opened and spring 105 has engaged the lug 107. Spring 106 is not yet effective to transmit torque.

Figure 28A:
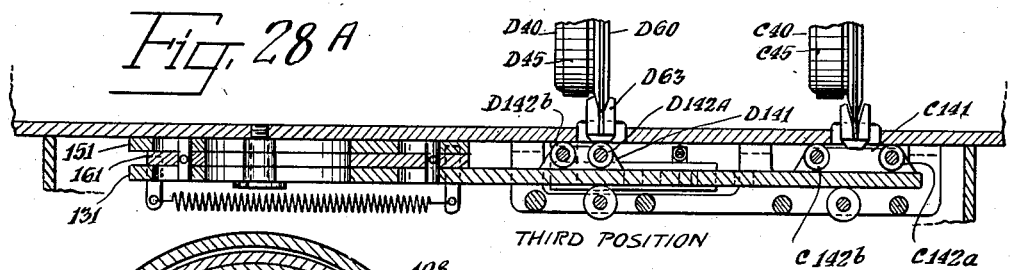
Fig. 28A is a fragmentary longitudinal horizontal cross-section of the speed-reduction gear controlling mechanism in a position corresponding to Fig. 28.
Figure 28:
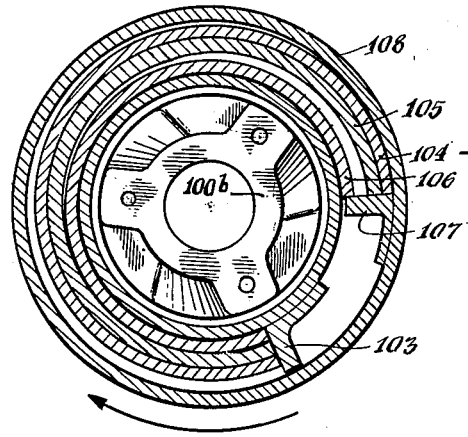
Fig. 28 is a view similar to Fig. 27, the parts being in the position where the rear gear reduction mechanism is effective.

Upon a further increase in the torque applied, the parts assume the position shown in Fig. 28 wherein springs 104 and 105 bear against the lug 107.

Figure 29A:
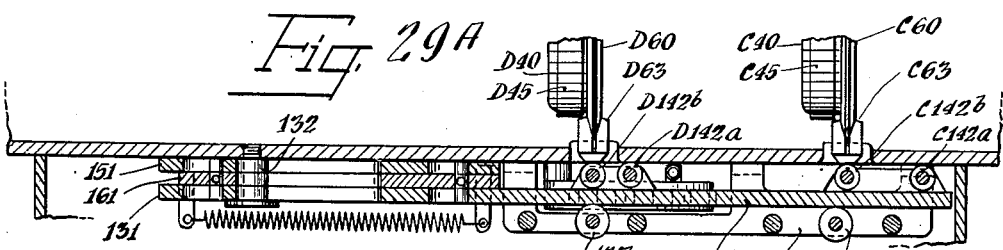
Fig. 29A is a fragmentary longitudinal horizontal cross-section of the speed-reduction gear controlling mechanism in a position corresponding to Fig. 29.
Figure 29:
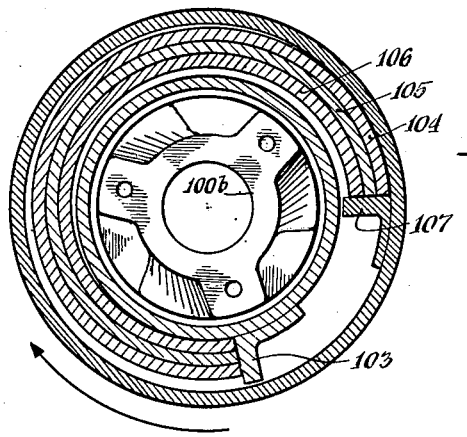
Fig. 29 is a view similar to Figs. 27 and 28 with the parts in position to cause both gear-reduction mechanisms to be effective.

When the torque is increased still further, the parts assume the position shown in Fig. 29 in which all three springs 104, 105, and 106 bear against the lug 107.

Figure 25:
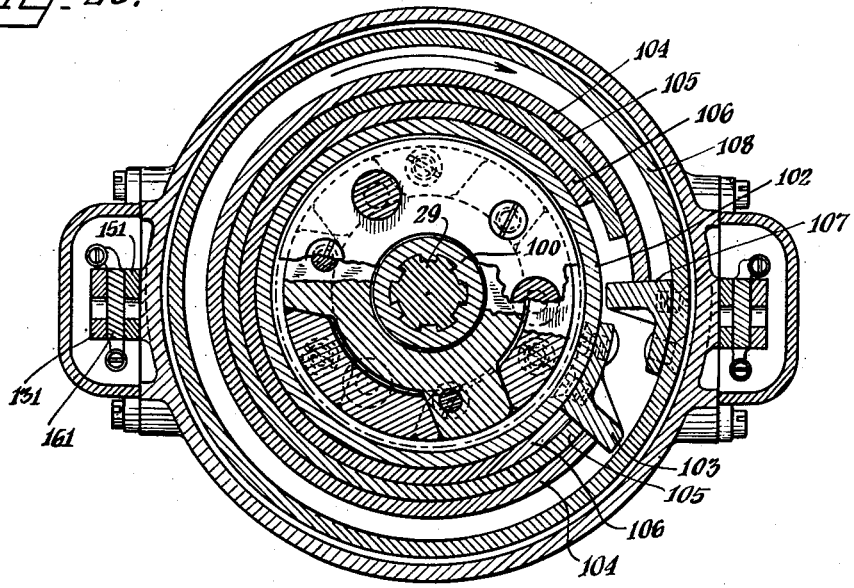
Fig. 25 is a transverse cross-section taken along the line 25—25 of Fig. 3, looking aft, the parts being in position where a direct drive is effective.

The three C springs 104, 105, and 106 may preferably be made with initial stress, i. e, tending to close to the position shown in Fig. 25. This will require the application of a certain output torque before the springs will open up.

A preferred means whereby the extent of relative movement of shafts 29 and 30 (a function of the torque) will be utilized to automatically control the effectivity of the gear reduction mechanisms, will now be described.

Referring to Figs. 1, 3, 19, 19A, 20, 20A, 23, 25, 26, 27, 27A, 28, 28A, 29, and 29A, the spider 100, which is splined to the aft portion of shaft 29, has attached thereto as by screws 100a, a cam member 100b shown in perspective in Fig. 19A, which is formed with three helical cam faces 100c. The disk member 110, which is mounted for rotation freely upon shaft 29, is provided with openings 110a, in which are slidably received rods 110a' which connect with a cam member 110b which is shown as having three helical cam faces 110c which are complementary to the cam faces 109c and are usually in the position of closest proximity. The other ends of rods 110a' have secured thereto a ring 120 (Figs. 1, 3, and 19) provided with a race for the ball members of a thrust bearing, the other race being the non-rotatable ring 121.

Ring 121 is formed with forwardly projecting rack members 122 which mesh with pinions 123 carried by a sleeve 124 (Fig. 26) secured to the transverse shaft 125 journaled in the housing 16. Said shaft carries a gear 126 on its starboard end and a gear 127 on its port end, which gears serve through intermediate mechanism to control the application of brake shoes D62 and D63. As members 109 and 110 have a limited rotative motion relative to each other, depending upon the forward torque transmitted from shaft 29 to shaft 30, it is obvious that this relative motion will cause the cam member 109b to move the cam member 110b forward axially, and will thereby force the racks 122 forwardly, causing the pinions 123 to rotate counter-clockwise (Figs. 1 and 3). Shaft 125 and gears 126 and 127 will, of course, rotate in the same direction.

Means operated by gears 126 and 127, respectively, are provided for causing brake shoes D63 and D62, respectively, to arrest the spider D60 and/or to cause brake shoes C63 and C62, respectively, to arrest the spider C60. For this purpose, the housing 16 has attached thereto on the starboard side a housing 130a and a similar housing 130b on the port side. Contained in the housing 130a is the mechanism shown in Fig. 20 and shown in expanded perspective in Fig. 20A. This mechanism includes a slide 131 mounted slidably on a screw 132 passing through slot 133 and fastened at its inner end, as by screw threads, to the housing 16. The forward end of the slide 131 is mounted between guides 134 and 135 fastened as by screws 134a and 135a to the housing 16 (see Figs. 19, 20, and 27A). These guides are connected by rods 136. Rollers 137 serve as anti-friction guide means for the slide 131. Said slide is preferably formed with four pairs of depressions 138 within which bear rollers 139 carried by arms 140 pivoted to the housing 16 and drawn toward each other by a spring 141. This comprises a detent mechanism for detaining the slide 131 in the position to which it has been moved.

The slide 131 is shown as formed with bent-over portions C141 and D141 (Figs. 19, 20A, and 23). Between the bent-over portions C141 are supported anti-friction rollers C142a and C142b which may be moved into position behind brake shoe C63 to force it into engagement with spider C60. Similarly, between bent-over portions D141 are supported anti-friction rollers D142a and D142b which may be moved into position behind brake shoe D63 to force it into engagement with spider D60. The rollers C142a, C142b, D142a, and D142b, are so disposed longitudinally of the slide 131 that when the slide is in its rearmost position, as shown in Figs. 20 and 20A, none of said rollers will engage with brake shoes C63 or D63. However, when the slide is moved forwardly one step to the position shown in Fig. 27A, the roller C142a will engage the brake shoe C63 and cause it to engage the spider C60, none of the other rollers being effective.

If the slide 131 is moved to the next position (third position), (Fig. 28A), the roller D142a engages the brake shoe D63 and presses it against the spider D60.

If the slide 131 is now moved to the next position (fourth position), (Fig. 29A), the roller C142b engages the brake shoe C63 and presses it against the spider C60 and, at the same time, roller D142b engages the brake shoe D63 and presses it against the spider D60.

While the slide 131 might be driven directly by gear 126 within the purview of the invention, it is preferred to provide an intermediate spring-biased connection whereby the gear 126 may rotate a certain extent under actuation of the cams 109b and 110b before the slide 131 is moved. This may be accomplished by the construction shown in Figs. 20 and 20A. As shown therein, a shorter slide 151 is formed with rack teeth 152 which mesh with the gear 126. Said slide is formed with a slot 153 through which the screw 132 passes. It is also formed with slots 154 and 155. Lying between the slides 131 and 151 is a slide 161 formed with a slot 163 through which said screw 132 passes. Slide 161 is also formed with pins 164 and 165 which operate in said slots 154 and 155, respectively, of slide 151 and in slots 131a and 131b, respectively, formed in slide 131. A helical tension spring 166 connects the forward end of slide 151 with the rearward end of slide 161 and a helical tension spring 167 connects the rearward end of slide 161 with the slide 131. These springs serve to bias the slides 131 and 151 rearwardly relative to slide 161.

When the gear 126 is in its normal position (cams 109b and 110b as close together as possible—gearing means C and D in direct drive), the slides 131, 151, and 161 are in their rearmost positions. If now, due to a torque increase, the gear 126 is rotated counter-clockwise a small extent, the slide 151 will be moved forwardly, increasing the tension in spring 166. During this time, the slides 161 and 131 do not move because of the restraining action of roller 139 in the forward notches 138. This situation continues until the end of the slots 154 and 155 bear against pins 164 and 165, respectively. Further motion of gear 126 causes slide 161 to be moved positively. Through action of pins 164 and 165 against the forward ends of the slots 131a and 131b respectively, the slide 131 is positively forced forward. As the rollers 139 are cammed out of the front notches 138, the slides 131 and 161 will be snapped forwardly on account of the tension in spring 166 causing the slide 131 to move quickly to its second position. Slides 161 and 131 move together until pins 164 and 165 are stopped in the forward ends of slots 154 and 155, respectively. The rollers 139 are now positioned in the second pair of notches 138 and the parts are in the position shown in Fig. 27A.

Further counter-clockwise rotation of gear 126 will cause said action to be repeated, causing the slide 131 to move stepwise, first to its third position and then to its fourth position.

If now, the gear 126 is gradually turned clockwise to its original position, the reverse action will take place. Rearward motion of slide 151 will now positively carry slide 161 one step rearwardly, tensioning spring 167. Further motion will cause slide 131 to be positively forced rearwardly, due to pins 164 and 165 striking the rear ends of slots 131a and 131b, respectively. As the rollers 139 are cammed out of the fourth pair of notches 138, spring 167 will snap slide 131 one step rearwardly. The same operation will take place as the slide is returned from the third to the second position and from the second to the first position.

The purpose of this mechanism is to prevent "hunting" or excessive shifting of the slide 131 and assures that if the slide is shifted to a certain position by the presence of a certain torque and therefore a certain relative position of the cams 100b and 110b, a small reduction or increase in the torque will not immediately result in movement of slide 131. As is desired, a considerable change in torque must occur before movement of the slide 131 is effected.

In the form shown, duplicate control means are provided on the port side of the transmission housing 16 to control the application of brake shoes C62 and D62. It is, of course, to be understood that such a second control mechanism is not absolutely necessary as one brake shoe on each of the spiders C60 and D60 would ordinarily suffice. If two brake shoes are to be operated by the slide 131, it will merely be necessary to gear or otherwise connect together the brake shoes C62 and C63 as well as brake shoes D62 and D63 for simultaneous application.

The above described mechanism provides means whereby the gear ratios of the transmission are varied in accordance with the torque applied to the output member. It is, of course, to be understood that the transmission ratios may be controlled by other conditions either alone or in association with such torque-responsive means. Such other conditions may be rotative speed of engine and/or output shaft, throttle opening, ratio of engine speed to throttle opening. To utilize said conditions it is merely necessary to provide known or other suitable mechanism responsive thereto, which is applied to slide 131 or to gear 126 to operate slide 131, either alone, or in association with changes in output torque.

Thus, for example, a mechanism such as is shown in U. S. Patent to Hans Thoma, No. 2,198,891 might be employed. Thus if the form of control means of Fig. 9 of said patent were employed the parts thereof might be so arranged that when arm 80a thereof is moved clockwise applicant's shaft 125 moves clockwise (as viewed in Fig. 20A), or applicant's slide 131 moved forwardly. The alternative control means shown in Thoma's Fig. 10 may also be used to operate applicant's shaft 125 or to operate directly applicant's slide 131.

*The main drive clutch*

This clutch is shown generally in Figs. 1 and 2 and various parts thereof are shown in Figs. 3 to 18 inclusive.

The clutch is so constructed that it engages to connect the flywheel A3 to the drive sleeve 12 whenever the flywheel (and engine) attain a predetermined rotative speed. No provision is disclosed for manually engaging the clutch nor for manually disengaging the clutch. Means are provided, however, to prevent the engagement of the clutch, irrespective of rotative speed.

Referring to Figs. 1 and 2, as well as the other figures, 200 designates the clutch spider which is formed with a hub 202 splined to the sleeve 12. Attached to its outer rim, as by screws 201a, is the conical ring 201. As shown, the inner surface of ring 201 and the ring portion of spider 200 are conically formed and receive therebetween one or more clutching shoes 223 to be described later.

Also splined to the sleeve 12 and located forwardly of the hub portion 202 is the collar 203 (shown in perspective in Fig. 8). This collar is formed with a plurality of recesses 204 having a spirally arranged bottom surface upon which rests clutching shoes 205 which are spring-pressed by springs 206 in an uphill direction with respect to said spiral surface. The outer diameter of collar 203 fits within a bore in the flywheel A3 with the clutching shoes 205 bearing within said bore. It will be seen that this forms a one-way clutch of more or less usual construction. It is to be noted, however, that this one-way clutch is so arranged that it cannot transmit forward rotation from the engine to the sleeve 12. It does, however, come into play when reverse torque is applied when the main speed-responsive clutch is not engaged and the vehicle is slowed down or when in descending a hill the vehicle attempts to drive the engine. When this occurs, the sleeve 12 turns collar 203 which, through clutch shoes 205, applies torque to the flywheel so that the engine may be used as a brake.

The numeral 207 (Figs. 1, 2, and 3) designates a ring journaled upon the exterior of hub 202. It carries a plurality of screw studs 208 which pass through holes 209 in the spider 200 and are attached at their rearward end to a ring 210 which ring, together with the ring 207, are axially slidable to a limited extent. 211 indicates springs normally holding said rings 207 and 210 in the rearward position shown. However, they may be moved forwardly at will by rollers 215 bearing on ring 210, said rollers being carried on arms 216 mounted for oscillation by the transverse shaft 217. At the port end of said shaft 217 and exteriorly of the casing 16, said shaft 217 is provided with a crank arm 218 through which said shaft is operated, when required (see Fig. 31).

The numeral 212 designates ball bearings between the ring 207 and a ring 213 which is connected for rotation with the flywheel and carries a plurality of pins 214 (Fig. 2) which, when in their forward position, serve to prevent engagement of the speed-responsive main drive clutch (see also Figs. 4, 5, 6, and 13).

220 (Figs. 17 and 18) designates screws fastened into the flywheel A3. Said screws serve to attach to the flywheel for rotation therewith the spider 221 (see also Figs. 11 and 13). Said spider is formed with three arms 222. Carried by each of said arms is a conical clutch shoe 223 provided with a radial arm 224 (see also Figs. 7, 9, 11, and 12). The inner end of said arm 224 is pivoted to the link 225 which is pivoted at 225a to the spider 221. The outer end of arm 224 has pivoted thereto link 226 preferably parallel to link 225 and pivoted loosely on shaft 226a. It is formed with an extension arm 227. Firmly attached to shaft 226a is the arm 228 which has attached thereto a bolt 229 passing through the end of arm 227 and provided with adjusting nuts 230 between which and the arm 227 is the coil compression spring 231. Said spring, of course, tends to bring the arms 227 and 228 together. This movement is limited by means of adjusting screw 232 held in adjusted position by lock nut 233.

It will be noted that the clutch shoes 223 are thus mounted for more or less radial movement so that when they move outwardly they will engage with the conical recess formed between the spider 200 and the ring 201. Centrifugal means are provided to cause such engagement. Such means, in the form shown, act through oscillating shaft 226a (clockwise, as viewed in Fig. 7). Such oscillation tends to move arm 228 therewith and through bolt 229 and spring 231 causes more or less corresponding movement of arm 227 which forces the clutch shoes 223 outwardly for engagement. The spring 231 assures that such action is properly cushioned. Nuts 230 permit adjustment of the pressure with which the clutch shoes are applied and the set screws 232 provide adjustment of their positions.

Figure 5:
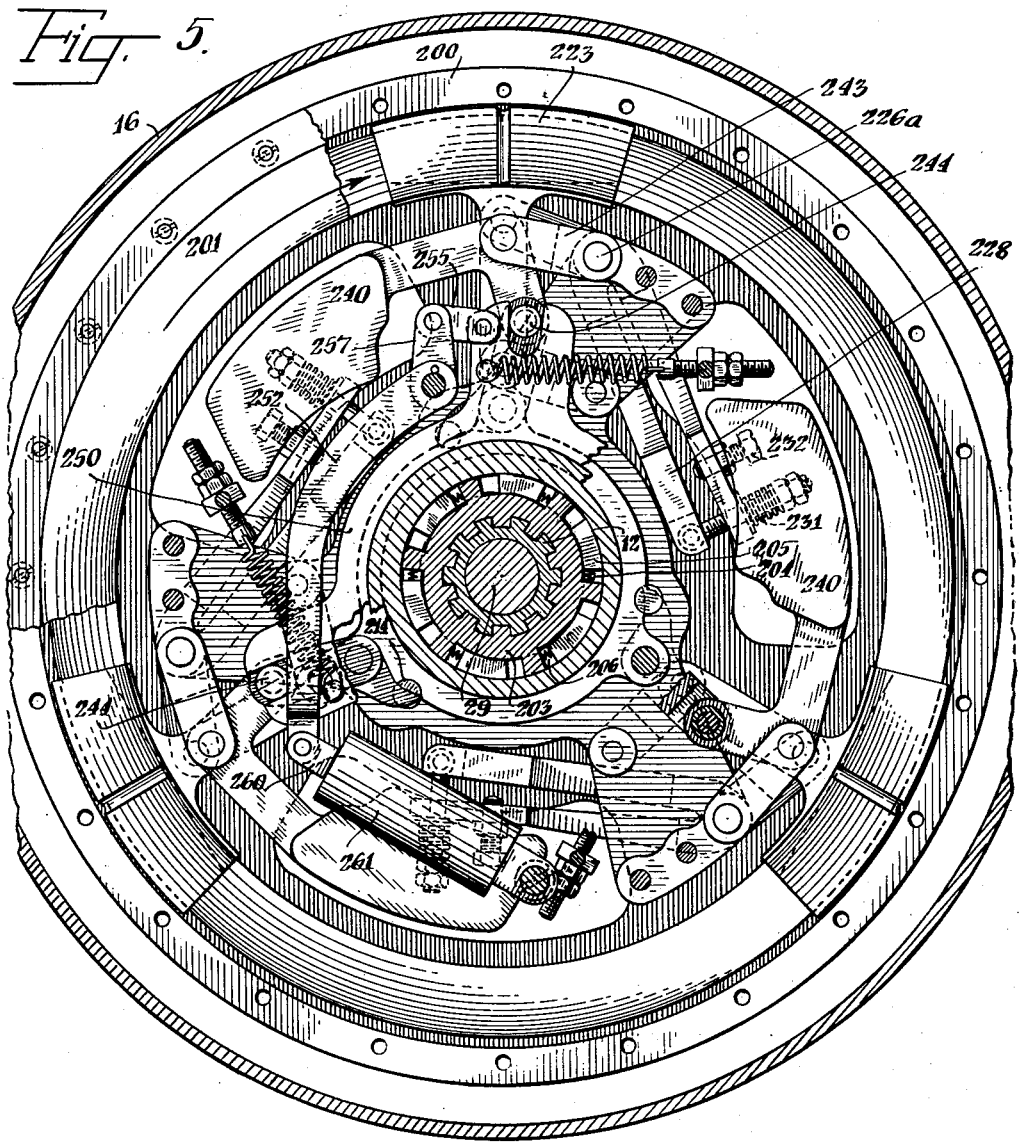
Fig. 5 is a cross-section similar to Fig. 4, but showing the clutch in engaged position.
Figure 14:
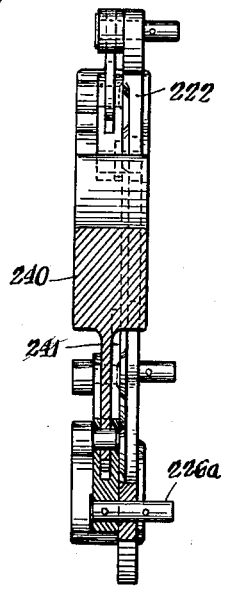
Fig. 14 is a cross-section taken along the line 14—14 of Fig. 13.

Referring now to Figs. 4, 5, 7, 13, 15, and 16, 240 designates a weight, three of which are shown. These are so mounted that they may move outwardly under the action of centrifugal force and, in so doing, rotate shaft 226a to move the clutch shoes outwardly. Each of the weights 240 is carried by an L-shaped arm 241 pivoted at 242 to a link 243 which is secured to shaft 226a. The end of arm 241 is pivoted at 244 to a link 245 pivoted at 246 to the spider 221. Thus, links 241 and 245 form a toggle through which force multiplication is secured. Each link 245 is provided with an extension nose 247. These noses lie adjacent the locking pins or bolts 214 (Figs. 1, 2, and 5). When the weights 240 are in their normal inward position (Figs. 4, 13 and 15), the noses 247 are sufficiently far from the crank shaft axis so that locking bolts 214 may be moved thereunder (by moving shaft 217 and parts connected thereto). If this is done, the weights are prevented from flying out and the clutch shoes from engaging, irrespective of the speed at which the flywheel is rotated.

250 designates a synchronizing spider (Figs. 4, 5, 15, and 17) which is formed with extension arms 251, each having a notch 252 therein receiving the pivot pin 244, previously referred to, which serves as a central pivot for the toggle consisting of links 245 and 241.

It will be seen that if the weights 240 are caused to move outwardly by centrifugal forces, the synchronizing spider 250 will move clockwise (Figs. 15 and 17) or counter-clockwise (as viewed in Figs. 4 and 5).

The spider 250 not only performs the function of causing the three weights to move in synchronism but it also serves as a universal member to which damping mechanism may be applied. For this purpose, a link 255 is pivoted to the synchronizing spider 250 at 256. Its other end is pivoted to a crankarm 257 pivoted to the flywheel at 258. Attached to arm 257 is the arm 259 which is pivoted to the piston rod 260 of a dashpot 261. This dashpot serves to prevent sudden engagement of the clutch shoes so that a smooth easy clutch engagement is secured.

Figure 15:
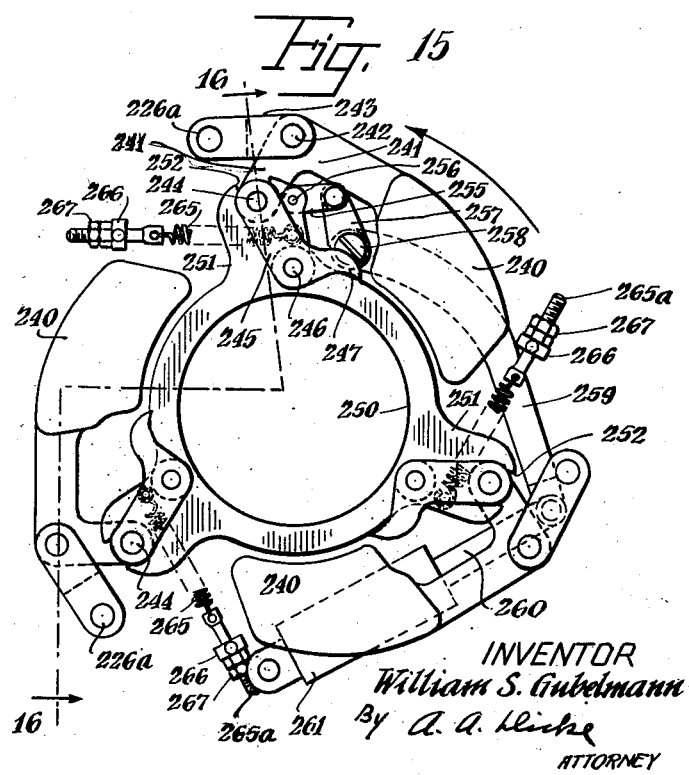
Fig. 15 is an elevation of some of the parts of the speed-responsive clutch (looking forward), the parts being shown in ineffective position.

Suitable spring means are provided to return the weights 240 toward the center when the flywheel speed drops to a certain point. This may be done by means of a spring within the dashpot or a spring attached to arm 259 or, as shown in Figs. 4, 5 and 15, by means of a plurality of springs 265 attached to bolts 265a passing through lugs 266 on the flywheel and held in adjustable position by means of adjusting nuts 267.

It will be seen that by the means shown and described, a speed-responsive main drive clutch is provided which operates in such a manner that when the engine speed is below a predetermined rate there will be no driving connection from the engine to the member to be driven thereby (sleeve 12 in the present instance) but that torque in the reverse direction may be transmitted from sleeve 12 to the flywheel. Furthermore, when the flywheel is speeded up to a certain rate, the clutch shoes will be gradually and smoothly engaged with their co-operating recess so that spider 200 and sleeve 12 will be gradually and smoothly brought to rotation at flywheel speed. Furthermore, if desired, such engagement of the clutch may be prevented by manually controllable means. This insures a definite neutral which is useful in engine testing or at any time when it is desired to speed up the engine without causing the clutch to engage.

Figure 13:
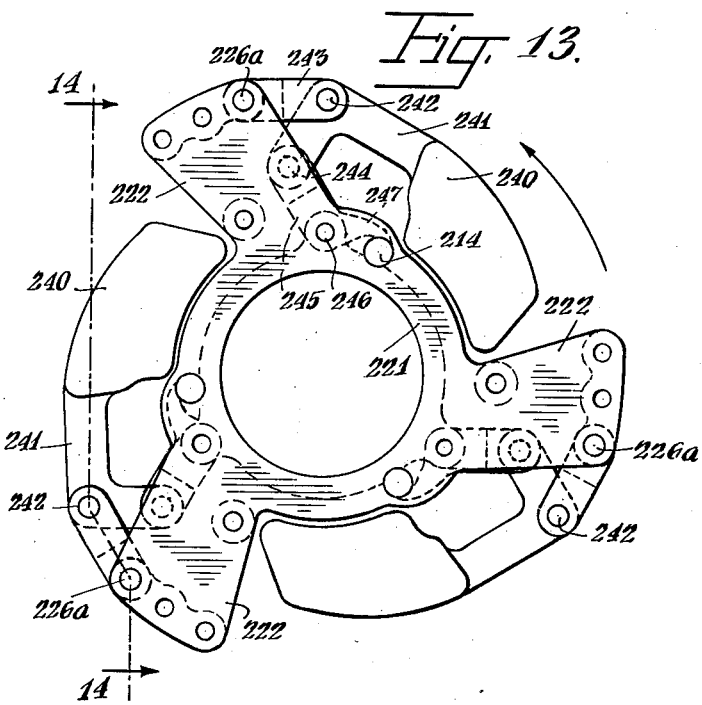
Fig. 13 is an elevation of some of the parts of the speed-responsive clutch (looking forward) in ineffective position.
Figure 16:
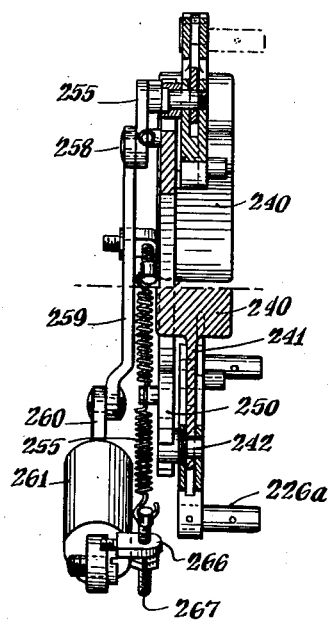
Fig. 16 is a cross-section taken along the line 16—16 of Fig. 15.

It will be noted that if the engine is speeded up while the pins 214 are in a position where they are engaged by the noses 247 on link 245, the effect of centrifugal force acting on weights 240 is such that the pins 214 cannot be withdrawn due to the grip of the noses 247 thereon (see Figs. 4 and 13).

Transmission control mechanism

The transmission mechanism shown and described provides a neutral, four forward speeds including a direct drive, which forward speeds are predetermined automatically in response to the torque in the output shaft, a manually predetermined "Reverse," and a manually predetermined second forward speed.

The conditions of the various mechanisms in order to bring about these various functions and the gear ratios resulting therefrom, are set forth in the following table:

| Operation | Control Lever | Flywheel Clutch | Front Gearing "C" | Rear Gearing "D" | Brake Shoes C62 | Brake Shoes C51 | Brake Shoes D62 |
|---|---|---|---|---|---|---|---|
| Neutral | "Neutral" | Blocked Out | | | | | |
| 4th Speed (Direct) | "Drive" | Speed Responsive | Direct | Direct | Free | Applied | Free |
| 3rd Speed | do | do | Effect | do | Applied | Free | do |
| 2nd speed | do | do | Direct | Effec | Free | Applied | Applied |
| 1st Speed | do | do | Effec | do | Applied | Free | do |
| Reverse | "Reverse" | do | Direct | do | Free | Applied | do |
| Manual 2nd speed | "2nd Speed" | do | Direct [1] | do | do | do | do |

| Operation | Brake Shoes D51 | Forward Drive Clutch 83, 84 | Reverse Drive Clutch 89, 90 | Pawl D63f on Disk D41 | Brake Applying Arms D62b | Gear Ratio Input to Output Shafts |
|---|---|---|---|---|---|---|
| Neutral | | Effec | Ineff | Ineff | Ineff | 1 to 1. |
| 4th Speed (Direct) | Applied | do | do | do | do | 1.5 to 1. |
| 3rd Speed | do | do | do | do | do | 2.1 to 1. |
| 2nd Speed | Free | do | do | do | do | 3.15 to 1. |
| 1st Speed | do | do | do | do | do | 3.9 to 1 (Reverse). |
| Reverse | do | Ineff | Effec | Effec | Effec | 2.1 to 1. |
| Manual 2nd Speed | do | Effec | Ineff | Ineff | do | |

[1] May become effective if output torque becomes sufficiently great, in which case C51 will be free and C62 applied.

The means for causing the various parts of the transmission to be put in the required condition to bring about the various functions set forth in the above table will now be described.

Referring to Figs. 31 to 36 inclusive, 300 indicates the ordinary steering wheel of a vehicle which, through shaft 301 and suitable connections driven thereby, controls the steering road wheels. 302 is the usual steering column. Pivoted thereto, as at 303, is a control lever 304. While in Fig. 31 this is for convenience shown as extending rearwardly toward the driver, in practice it would be arranged to extend to the right of the steering column. The lever 304 is arranged between selector plates 305 and 306. The plate 305 is shown formed with a downwardly extending flange 305a and the plate 306 with an upwardly extending flange 306a. Said flanges are formed with notches 305b and 306b, respectively. Normally, i. e., when the lever 304 is in neutral position, these notches align. The depth of each of these notches is slightly greater than the thickness of lever 304. It will be seen that if lever 304 is lifted and then moved clockwise, it will carry plate 305 with it but will leave plate 306 in its original position. Similarly, if lever 305 is moved downwardly and then clockwise, it will shift the lower plate 306, leaving the plate 305 unshifted. To prevent simultaneous shifting of plates 305 and 306, it may be desirable to provide an interlock. This may take the form of a U-shaped lever 310 (Fig. 36) pivoted at 311 to the steering column 302 and lying adjacent the periphery of flanges 305a and 306a. Said lever 310 is shown formed with projections 310a and 310b cooperating with the top and bottom surfaces respectively of the lever 304. The ends of lever 310 are provided with rearwardly extending lugs 312a and 312b respectively, co-operating with notches 313a and 313b, respectively, said notches being formed in plates 305 and 306, respectively.

In the position of the parts shown in Fig. 36, the lugs 312a and 312b serve to lock the plates 305 and 306. However, it will be seen that if the lever 304 is raised, lever 310 will be raised, lug 312a will be moved out of notch 313a, freeing plate 305 for operation, whereas lug 312b will penetrate further into notch 313b, holding plate 306 locked.

Plate 305 is carried by a tube 315 surrounding the shaft 301 and the lower plate 306 is attached to a tube 316. The tube 315 carries at its lower end a cam plate 317 which may take the form shown in Fig. 33. The tube 316 carries at its lower end a cam plate 318 which may take the form shown in Fig. 32.

Referring to Fig. 34, the upper end of the steering column 302 is preferably enlarged as at 302a to provide space for the plates 305 and 306 and the pivot mounting 303 for the lever 304. It is also formed with a slot 302b having a width slightly more than double that of the thickness of lever 304. This slot provides clearance for the lever 304 and the ends thereof may serve as stops to limit the movement of lever 304. Adjacent the upper edge of the slot 302b appear the legends "N" (meaning neutral) and "Reverse." Immediately below said slot appear the legends "N" "Drive" and "Second speed." When the lever 304 is raised and then moved clockwise its full extent, it will move the plate 305, tube 315, and cam plate 317 to their full extent clockwise, causing the transmission to be adjusted for reverse by means partly described and partly to be described.

When the lever 304 is depressed and moved one step clockwise it will carry the plate 306, tube 315, and cam 318 one step clockwise, conditioning the transmission for forward drive at a gear ratio determined by the torque-responsive gear-ratio controlling mechanism. When the lever is moved further clockwise, the cam 318 is moved to its extreme clockwise position, thereby preventing the transmission from moving to the direct drive condition, irrespective of torque conditions.

The connections from cams 317 and 318 to the transmission will now be described:

Cooperating with the cam 318 is a cam follower 318a, preferably in the form of a roller, mounted upon a bar 318b the front end of which is slidably supported in a slot in a guide member 319. Its rearward end is connected through a pin and slot connection 320 to the upper end 321 of a lever pivoted at 322 to any suitable support. Said lever has a downwardly extending portion 323 to which is pivoted at 324 a link 325, the other end of which is pivoted at 326 to the upper end of the lever D62d, previously described. A spring 327 is shown provided to hold the roller 318a against the cam 318. This spring would not be necessary if a positive cam mechanism were provided.

Co-acting with cam 317 is a cam follower 317a carried by a plate 317b the front end of which may be supported in a slot in said guide member 319. At its rearward end it is pivoted at 330 to the upper end of a lever 331 pivoted at 332 to any suitable support. Also, pivoted at 330 is a link 333, the rear end of which is pivoted at 334 to the upper end of lever 99a attached to shaft 99, previously described.

The link 318b is shown provided with a pin 340 located in a slot in the upper end of a lever 341 pivoted at 342 to the upper end of a lever 343 pivoted at 344 to any suitable support. Pivoted to the lever 343 intermediate its ends, as at 345, is a link 346 which is pivoted at its other end 347 to a downward extension 348 of the lever 331. The lower end 349 of the lever 341 is pivoted as at 350 to a link 351 which is pivoted at 352 to the arm 218 previously described and carried by the shaft 217 (see Figs. 1 and 2).

*Operation of the control mechanism*

With the parts shown in the positions indicated in Figs. 31 to 36 inclusive, the transmission is in the "Neutral" position, viz., the shaft 217, arm 216, and roller 215 are so positioned that the roller 215 is sufficiently far forward to position the pins 214 so that the clutch shoes 223 cannot engage even though the engine is speeded up to or beyond the normal engaging speed. If now (while the engine is running at low speed), the lever 304 is depressed and then moved clockwise to the drive position, the cam 318 will be moved one step, drawing the link 318b forward one step. This motion is not sufficient to cause lever 321, 323, to move, the said one step movement being taken up by the pin and slot connection 320. However, pin 340 rocks lever 341, 349, counter-clockwise about the fulcrum 342, rocking arm 218, shaft 217, arm 216, and roller 215, rearwardly, thus releasing the speed-responsive clutch for engagement upon the occurrence of a predetermined speed. (The fulcrum 342 cannot move forward due to the stop 99c preventing rearward motion of arm 99a). The transmission will therefore be in the position to assume any of its forward drive ratios, as determined by the torque in the output shaft.

It will be noted that if the engine is speeded up while the control parts are in neutral position, the speed responsive clutch cannot be engaged because the noses 247 engage pins 214 (Fig. 13). It will also be noted that while the engine is running at high speed with lever 304 in neutral position, it is not possible to move the control mechanism from neutral to any other speed position due to the grip applied by noses 247 on pins 214 resulting from the centrifugal force acting on weights 240. The control lever 304 can be moved from "Neutral" to "Drive," "2nd speed" or "Reverse" which will move the shaft 217 counter-clockwise (as viewed in Fig. 31) but the clutch shoes 223 cannot engage as the pins 214 are held by the noses 247. If, thereupon, the engine is slowed down to idling speed, the pins 214 will be moved rearwardly by springs 211 (Fig. 2) to free the clutch for engagement. If the engine is now speeded up, the clutch shoes 223 will be gradually engaged and the action called for by the setting of lever 304 is effected.

If the engine is running at or above clutch engagement speed with the transmission control lever 304 in "Drive" or "2nd speed" position, it is not possible to condition the transmission for "Reverse" without first slowing the engine to idling speed. While the lever 304 may be moved to "Neutral" no effect is produced on the mechanism as the shaft 217 cannot rotate clockwise (Fig. 31) because the ends of pins 214 will engage the noses 247 on link 245 (Figs. 5 and 13). If now an attempt is made to move the lever 304 from "Neutral" to "Reverse," such movement is blocked because cam 317 (Fig. 33) cannot move slide 317b forward. For slide 317b to move forward shaft 217 must be rotated counter-clockwise and this shaft is already in its counter-clockwise position. If now the engine is slowed down to idling speed (lever 304 being in "Neutral"), the noses 247 will clear pins 214 and the parts will return to normal position.

If now, the lever 304 is moved further to the full extent of motion possible, the lever 321, 323 will be rocked counterclockwise, causing the shaft D62c to be rocked clockwise (see also Figs. 1 and 30) causing the fingers D62b and D63b to be depressed, positively forcing the rear gearing into effective position, thus providing a positive reduced speed drive (second speed).

If the lever 304 is now returned to neutral position, raised, and moved clockwise to its full extent, the transmission will be set for reverse operation. This is accomplished by the cam 317 shifting roller 317a and link 317b forwardly. This, through link 333 and arm 99a, causes shaft 99 to rock counter-clockwise (Fig. 31), disengaging the forward drive clutch plates 83, 84 and engaging the reverse clutch plates 89, 90. At the same time, lever 99b on shaft 99 causes link D63g to rock arm D63d and attached shaft D63c clockwise (see also Figs. 1, 20, and 30). This lifts locking finger D63f to position for arresting the disk D41 by engagement with ratchet teeth D41a so that the disk D41 and the cage of which it forms a part is prevented from rotating clockwise as hereinbefore referred to. At the same time, finger D63f lifts bail D62b' causing the fingers D62b and D63b to be depressed to apply the brake shoes D62 and D63 to the disk D61. At the same time, lever 331, 348, is rocked counter-clockwise, moving link 346 rearwardly, rocking lever 343 clockwise about its pivot 344. This movement causes lever 341, 349 to be rocked counter-clockwise about pin 340 acting as a fulcrum. Thus, through link 351, the lever 213 is rocked counter-clockwise, moving arm 216 and roller 215 rearwardly, releasing the main drive clutch. Thereupon, when the engine is speeded up to the speed at which the main drive clutch becomes effective, sleeve 12 will be rotated clockwise, as viewed from the engine. The forward gear reduction means C (since there is no forward drive torque in the output shaft) is ineffective and transmits motion at 1 to 1 speed to the sleeve C22 which carries gear D17 (see Figs. 1 and 3), the rotation of which causes gear D18 to rotate counter-clockwise, turning with it shaft D19 and gear D20. The latter gear causes the annular ring gear 93 to be rotated counter-clockwise at a lower speed. Since the reverse drive clutch 89, 90 is effective, the member 87 will be rotated counter-clockwise, causing shaft 29 and the output shaft 30 to be rotated counter-clockwise. It will be seen therefore that the vehicle will be driven in reverse at a gear ratio determined by the gearing D (2.1 to 1) and the gear reduction effected by the engagement of gear D20 with gear 93 (approximately 13 to 7) providing an over-all gear reduction of about 3.9 to 1.

It will be noted that the reverse may be used to prevent the vehicle rolling backward when parked on an uphill slope. At this time, the shafts 30 and 29 will tend to rotate counter-clockwise (as viewed from the engine). This will cause the sleeve 12 to tend to rotate clockwise. Clutch shoes 205 (Fig. 8) will engage the bore in the flywheel and, as the engine is not turning, the car cannot roll back.

Similarly, when the vehicle is parked facing down a slope and the control lever 304 is in any position other than reverse, the car is held against rolling forward.

It will also be noted that if it is desired to start the engine by pushing or pulling the vehicle forwardly, this may be accomplished by putting the lever in "Neutral" or "Drive" or "2nd speed." The shaft 29 will rotate forwardly so that the engine is rotated forwardly through the one way clutch comprising clutch shoes 205 (Fig. 8). During this time it is unimportant that the centrifugal clutch is not engaged. However, to prevent sudden forward motion of the vehicle when the engine starts, it will usually be preferred to keep the lever 304 in "Neutral" position.

If the engine is to be started by pushing or pulling the vehicle backward, the control lever is moved to the "Reverse" position. Retrograde movement of the vehicle will then rotate the sleeve 12 and member 203 forwardly causing the one way clutch (shoes 205, Fig. 8) to rotate the engine forwardly for starting it.

It will be noted that the constructions shown and described will serve admirably to accomplish the objects stated above. It is to be understood, however, that the constructions disclosed above are intended merely as illustrative of the invention and not as limiting, as various modifications therein may be made without departing from the invention as defined by a proper interpretation of the claims which follow.

I claim:

1. In a power transmission, an input member, an output member, and connections therebetween comprising coaxial input and output gears connected for operation with said input and output members respectively, a countershaft having gears thereon meshing respectively with said first-mentioned gears, support means for said countershaft rotatable around the axis of said coaxial gears, means operative to prevent such rotation reversely of the direction of movement of said input gear, said gears being of such relative size that the input gear causes the output gear to rotate at a lower speed when the countershaft does not revolve, and means for arresting rotation of said countershaft on its axis whereby said countershaft revolves about the axis of said input and output gears and said input and output gears rotate at the same speed, an annular gear coaxial with said input and output gears and meshing with that gear on the countershaft which meshes with said output gear, clutch means for alternatively connecting said output gear or said annular gear with said output member, means for at will preventing forward revolution of said countershaft support, whereby co-directional or a reverse rotation is applied to said output member, a source of power and a clutch between said power source and said input member and a common manual control means serving concomitantly to disengage the output gear from the output member, engage the annular gear with the output member, make effective the means for preventing forward revolution of said countershaft support and make effective the clutch between the power source and said input member.

2. In a power transmission, an input member, an output member, and connections therebetween comprising coaxial input and output gears connected for operation with said input and output members respectively, speed-change gears connecting said first-mentioned gears, support means for said speed-change gears rotatable around the axis of said coaxial gears, means operative at times to prevent such rotation, and means for arresting rotation of said speed-change gears on their axis whereby said speed-change gears revolve about the axis of said input and output gears and said input and output gears rotate at the same speed, a reversing gear coaxial with said input and output gears and meshing with that one of the gears of said speed-change gearing which meshes with said output gear, clutch means for selectively connecting said output gear or said reversing gear with said output member, means for at will preventing forward revolution of said support, whereby co-directional or a reverse rotation is applied to said output member, a source of power and a clutch between said power source and said input member, and a common manual control means serving concomitantly to disengage the output gear from the output member, engage the reversing gear with the output member, make effective the means for preventing revolution of said speed-change gearing support and make effective the clutch between the power source and said input member.

3. In a power transmission, an input member, an output member, and connections therebetween comprising coaxial input and output gears connected for operation with said input and output members respectively, a countershaft having gears thereon meshing respectively with said first-mentioned gears, support means for said countershaft rotatable around the axis of said coaxial gears, means operative to prevent such rotation reversely of the direction of movement of said input gear, said gears being of such relative size that the input gear causes the output gear to rotate at a lower speed when the countershaft rotates on its axis but does not revolve, and brake means for arresting rotation of said countershaft on its axis whereby said countershaft revolves about the axis of said input and output gears and said input and output gears rotate at the same speed, the brake means comprising a brake drum mounted concentrically with the countershaft and connected for rotation therewith, at least one brake shoe engageable at times with said brake drum and carried by the countershaft support, a sleeve surrounding said countershaft and concentric therewith and provided with means for causing disengagement of said brake shoe with said brake drum whereby rotation of said countershaft on its axis is permitted, and means for operating said sleeve to cause such disengagement.

4. In a power transmission, an input member, an output member, and connections therebetween comprising coaxial input and output gears connected for operation with said input and output members respectively, a countershaft having gears thereon meshing respectively with said first-mentioned gears, support means for said countershaft rotatable around the axis of said coaxial gears, means operative to prevent such rotation reversely of the direction of movement of said input gear, said gears being of such relative size that the input gear causes the output gear to rotate at a lower speed when the countershaft rotates on its axis but does not revolve, and brake means for arresting rotation of said countershaft on its axis whereby said countershaft revolves about the axis of said input and output gears, and said input and output gears rotate at the same speed, the brake means comprising a brake drum and at least one brake shoe each mounted concentrically with the countershaft, one of said brake parts being connected for rotation with the countershaft and the other being carried by the countershaft support, a sleeve surrounding said countershaft and concentric therewith and provided with means for determining the effectivity of said brake means whereby rotation of said countershaft on its axis is permitted or prevented, and means for operating said sleeve.

5. In a power transmission, an input member, an output member, and connections therebetween comprising coaxial input and output gears connected for operation with said input and output members respectively, a countershaft having gears thereon meshing respectively with said first-mentioned gears, support means for said countershaft rotatable around the axis of said coaxial gears, means operative to prevent such rotation reversely of the direction of movement of said input gear, said gears being of such relative size that the input gear causes the output gear to rotate at a lower speed when the countershaft rotates on its axis but does not revolve, and brake means for arresting rotation of said countershaft on its axis whereby said countershaft revolves about the axis of said input and output gears and said input and output gears rotate at the same speed, the brake means comprising a brake drum mounted concentrically with the countershaft and connected for rotation therewith, at least one brake shoe engageable at times with said brake drum and carried by the countershaft support, a sleeve surrounding said countershaft and provided with a cam for causing disengagement of said brake shoe with said brake drum when the sleeve is rotated relative to the countershaft support, and means for rotating said sleeve to cause such disengagement.

6. A power transmission according to claim 5 in which the means for rotating the cam operating sleeve comprises gear teeth on said sleeve and a disk member mounted concentrically with said input and output gears and normally rotatable with said countershaft support but arranged to have a limited movement relative thereto and spring means arranged between said disk and said countershaft support for biasing said disk to the limit of its motion relative to said support, said disk having teeth meshing with the teeth on said sleeve, and brake means adapted to engage said disk causing relative movement between it and said countershaft support against the bias of said spring means, whereby the sleeve is turned to a position where the brake means are released, permitting the countershaft to rotate on its axis and causing gear reduction to be effective and the forward rotation of the countershaft support and the disk to be arrested.

7. In a power transmission, an input member, an output member, and connections therebetween comprising coaxial input and output gears connected for operation with said input and output members respectively, a countershaft having gears thereon meshing respectively with said first-mentioned gears, support means for said countershaft rotatable around the axis of said coaxial gears, means operative to prevent such rotation reversely of the direction of movement of said input gear, said gears being of such relative size that the input gear causes the output gear to rotate at a lower speed when the countershaft rotates on its axis but does not revolve, and brake means for arresting rotation of said countershaft on its axis whereby said countershaft revolves about the axis of said input and output gears and said input and output gears rotate at the same speed, the brake means connected between the countershaft and the countershaft support, spring means tending to cause engagement of said brake means, and means operable to overcome said spring and to cause disengagement of said brake means, said means comprising a disk member mounted concentrically with said input and output gears and normally rotatable with said countershaft support but arranged to have a limited movement relative thereto and spring means arranged between said disk and said countershaft support for biasing said disk to the limit of its motion relative to said support, and a second brake means adapted to engage said disk causing relative movement between it and said countershaft support against the bias of said spring means, and connections between said disk and said first mentioned brake means to make said first mentioned brake means ineffective upon the occurrence of such relative movement between the disk and said countershaft support against the bias of said spring means, whereby the countershaft is permitted to rotate on its axis and the gear reduction is made effective and the forward rotation of the countershaft support is arrested.

8. In a power transmission, an input member, an output member and means therebetween effective to vary the speed ratio between said input and output members, an output shaft and means for automatically varying said speed ratio in accordance with the torque applied to said output shaft comprising spring means between said output member and said output shaft, means so arranged that relative rotary movement of the output member and output shaft as permitted by said spring means under the action of torque applied to said output shaft by said output member will produce movement thereof, and means moved thereby to vary the speed ratio between said input and output members comprising a slide, a second slide, a spring-biased lost-motion connection therebetween and means operated by said second slide connected to vary said speed ratio.

9. In a power transmission, an input member, an output member and means therebetween effective to vary the speed ratio between said input and output members, an output shaft and means for automatically varying said speed ratio in accordance with the torque applied to said output shaft comprising initially stressed spring means between said output member and said output shaft, means so arranged that relative rotary movement of the output member and output shaft as permitted by said initially stressed spring means under the action of torque applied to said output shaft by said output member sufficient to overcome the initial stress in said spring means will produce movement thereof, and means moved thereby to vary the speed ratio between said input and output members comprising a slide, a second slide, a spring-biased lost-motion connection therebetween and means operated by said second slide connected to vary said angular velocity ratio.

10. In a power transmission, an input member, an output member and means therebetween effective to vary the speed ratio between said input and output members, an output shaft and means for automatically varying said speed ratio in accordance with the torque applied to said output shaft comprising initially stressed spring means between said output member and said output shaft, means so arranged that relative rotary movement of the output member and output shaft as permitted by said initially stressed spring means under the action of torque applied to said output shaft by said output member sufficient to overcome the initial stress in said spring means will produce movement thereof, and means moved thereby to vary the speed ratio between said input and output members comprising a slide, a second slide, a spring-biased lost-motion connection therebetween and a third slide operated by said second slide through a spring-biased lost-motion connection connected to vary said speed ratio.

11. In a power transmission, an input member, an output member and means therebetween effective to vary the speed ratio between said input and output members, an output shaft and means for automatically varying said speed ratio in accordance with the torque applied to said output shaft comprising initially stressed spring means between said output member and said output shaft, means so arranged that relative rotary movement of the output member and output shaft as permitted by said initially stressed spring means under the action of torque applied to said output shaft by said output member sufficient to overcome the initial stress in said spring means will produce movement thereof, and means moved thereby to vary the speed ratio between said input and output members comprising a slide, a second slide, a spring-biased lost-motion connection therebetween and a third slide operated by said second slide through a spring-biased lost-motion connection connected to vary said speed ratio, and spring-biased plural-position detent means acting upon said third slide so that when sufficient force is applied to said third slide to cause it to move against the restraint of said detent means said third slide will move the entire distance to its next detent position.

12. In a power transmission, an input member, an output member and means therebetween effective to vary the speed ratio between said input and output members, an output shaft and means for automatically varying said speed ratio in accordance with the torque applied to said output shaft comprising spring means between said output member and said output shaft, means so arranged that relative rotary movement of the output member and output shaft as permitted by said spring means under the action of torque applied to said output shaft by said output member will produce movement thereof, and means moved thereby to vary the speed ratio between said input and output members comprising an adjustable member, a second adjustable member, a spring-biased lost-motion connection therebetween, and means operated by said second adjustable member connected to vary said speed ratio.

13. In a power transmission, an input member, an output member and means therebetween effective to vary the angular velocity ratio between said input and output members, an output shaft and means for automatically varying said angular velocity ratio in accordance with the torque applied to said output shaft comprising initially stressed spring means between said output member and said output shaft, means so arranged that relative rotary movement of the output member and output shaft as permitted by said initially stressed spring means under the action of torque applied to said output shaft by said output member sufficient to overcome the initial stress in said spring means will produce movement thereof, and means moved thereby to vary the angular velocity ratio between said input and output members comprising an adjustable member, a second adjustable member, a spring-biased lost-motion connection therebetween and means operated by said second adjustable member connected to vary said angular velocity ratio.

14. In a power transmission, an input member, an output member and means therebetween effective to vary the speed ratio between said input and output members, an output shaft and means for automatically varying said speed ratio in accordance with the torque applied to said output shaft comprising initially stressed spring means between said output member and said output shaft, means so arranged that relative rotary movement of the output member and output shaft as permitted by said initially stressed spring means under the action of torque applied to said output shaft by said output member sufficient to overcome the initial stress in said spring means will produce movement thereof, and means moved thereby to vary the angular velocity ratio between said input and output members comprising an adjustable member, a second adjustable member, a spring-biased lost-motion connection therebetween and a third adjustable member operated by said second adjustable member through a spring-biased lost-motion connection connected to vary said speed ratio.

15. In a power transmission, an input member, an output member and means therebetween effective to vary the speed ratio between said input and output members, an output shaft and means for automatically varying said speed ratio in accordance with the torque applied to said output shaft comprising initially stressed spring means between said output member and said output shaft, means so arranged that speed movement of the output member and output shaft as permitted by said initially stressed spring means under the action of torque applied to said output shaft by said output member sufficient to overcome the initial stress in said spring means will produce movement thereof, and means moved thereby to vary the speed ratio between said input and output members comprising an adjustable member, a second adjustable member, a spring-biased lost-motion connection therebetween and a third adjustable member operated by said second adjustable member through a spring-biased lost-motion connection connected to vary said speed ratio, and spring-biased plural-position detent means acting upon said third adjustable member so that when sufficient force is applied to said third adjusting member to cause it to move against the restraint of said detent means said third adjusting member will move the entire distance to its next detent position.

16. In a power transmission, an input member comprising a gear, an output member comprising a gear, speed-change gearing connecting said input gear to said output gear to drive the output gear at a different speed but in the same direction as said input gear, a support for said speed-change gearing rotatable around the axis of said input gear, means operative at times to prevent such rotation of said support, means for arresting rotation of said speed-change gears on their axes and simultaneously permitting said support to revolve around the axis of the input gear, whereby said input gear causes said output gear to rotate at the same speed as the input gear, together with a second such power transmission arranged in series with the first-mentioned power transmission so that the output member of the first transmission is connected to for driving the input member of the second transmission, the gear ratio of the two transmissions being different, together with means for making neither, either, or both transmissions effective to provide speed change whereby four different speed ratios are provided, together with means governed by the torque applied to the output member of the second transmission to select the drive ratios of each of said transmissions, said last mentioned means comprising mechanism effective when a certain torque is applied to the output member of the second transmission to shift to a lower gear ratio that transmission which provides the lesser gear ratio change and when a greater torque is applied to the output member of the second transmission to restore said first mentioned transmission to its original condition and to cause the other transmission to shift to its lower drive ratio and when a still greater torque is applied to the output member of the second transmission to cause both transmissions to be shifted to their lower drive gear ratio.

17. In a power transmission, an input member, an output member, and connections therebetween comprising coaxial input and output gears connected for operation with said input and output members respectively, a pair of connected coaxial gears meshing respectively with said first-mentioned gears, support means for journaling said connected gears rotatable around the axis of said coaxial gears, means operative to prevent such rotation reversely of the direction of movement of said input gear, said gears being of such relative size that the input gear causes the output gear to rotate at a lower speed when the connected gears rotate on their axis but do not revolve, and brake means for arresting rotation of said connected gears on their axis causing them to revolve about the axis of said input and output gears and said input and output gears rotate at the same speed, the brake means comprising a brake drum mounted concentrically with the connected gears and connected for rotation therewith, at least one brake shoe engageable at times with said brake drum and carried by the said support, a rotatable member provided with means for causing disengagement of said brake shoe with said brake drum whereby rotation of said connected gears on their axis is permitted, and means for operating said member to cause such disengagement, the means for rotating the rotatable brake-controlling member comprising gear teeth and a disk member mounted concentrically with said input and output gears and normally rotatable with said countershaft support but arranged to have a limited movement relative thereto and spring means arranged between said disk and said rotatable connecting gear support for biasing said disk to the limit of its motion relative to said support, said disk having teeth meshing with the teeth on said rotatable brake-controlling member, and brake means adapted to engage said disk causing relative movement between it and said connecting gear support against the bias of said spring means, whereby the rotatable brake-controlling member is turned to a position where the brake means are released, permitting the connected gears to rotate on their axis and causing gear reduction to be effective and the forward rotation of the connecting gear support and the disk to be arrested.

18. In a power transmission, an input member comprising a gear, an output member comprising a gear mounted coaxially with said input gear, reduction gearing connecting said input gear to said output gear to drive the output gear at a lower speed but in the same direction as said input gear, a support for said reduction gearing rotatable around the axis of said input and output gears, means operative at times to prevent such rotation of said support, means for arresting rotation of said reduction gears on their axes and simultaneously permitting said support to revolve around the axis of the input and output gears, whereby said input gear causes said output gear to rotate at the same speed as the input gear, the means for arresting rotation of the reduction gears on their axes comprising brake means therefor, means to determine the extent of effectivity of said brake means comprising adjustable resilient means acting in one direction and an adjustable abutment serving to limit movement in response to said resilient means.

19. In a power transmission, an input member comprising a gear, an output member comprising a gear mounted coaxially with said input gear, reduction gearing connecting said input gear to said output gear to drive the output gear at a lower speed but in the same direction as said input gear, a support for said reduction gearing rotatable around the axis of said input and output gears, means operative at times to prevent such rotation of said support, means for arresting rotation of said reduction gears on their axes and simultaneously permitting said suppport to revolve around the axis of the input and output gears, whereby said input gear causes said output gear to rotate at the same speed as the input gear, the means for arresting rotation of the reduction gears on their axes comprising brake means therefor, spring means biased to make said brake means effective and a second brake means arranged when effective to overcome said spring means and make said first brake means ineffective, said second brake means comprising a disk mounted coaxially with said input and output gears and a brake shoe cooperable therewith at times to arrest said disk, overcome said spring means, and make said first-mentioned brake means ineffective, said disk being formed with a V-shaped periphery and said brake shoe having a complementary form and comprising separated parts resiliently connected for relative movement in a direction generally parallel to the axis of said disk.

20. In a power transmission, an input member comprising a gear, an output member comprising a gear mounted coaxially with said input gear, reduction gearing connecting said input gear to said output gear to drive the output gear at a lower speed but in the same direction as said input gear, a support for said reduction gearing rotatable around the axis of said input and output gears, means operative at times to prevent such rotation of said support, means for arresting rotation of said reduction gears on their axes and simultaneously permitting said support to revolve around the axis of the input and output gears, whereby said input gear causes said output gear to rotate at the same speed as the input gear, the means for arresting rotation of the reduction gears on their axes comprising brake means therefor, spring means biased to make said brake means effective and a second brake means arranged when effective to overcome said spring means and make said first brake means ineffective, said second brake means comprising a disk mounted coaxially with said input and output gears and a brake shoe cooperable therewith at times to arrest said disk, overcome said spring means, and make said first-mentioned brake means ineffective, and means responsive to the torque acting on the output gear for applying said brake shoe.

21. In a power transmission, a shaft, an input member mounted on said shaft and comprising a gear, an output member mounted on said shaft coaxially with said input gear and comprising a gear, reduction gearing connecting said input gear to said output gear to drive the output gear at a lower speed but in the same direction as said input gear, a support for said reduction gearing rotatable around the axis of said input and output gears a part of which support bears directly on said shaft, means operative at times to prevent such rotation of said support, means for arresting rotation of said reduction gears on their axes and simultaneously permitting said support to revolve around the axis of the input and output gears, whereby said input gear causes said output gear to rotate at the same speed as the input gear, the means for arresting rotation of the reduction gears on their axes comprising brake means therefor, spring means biased to make said brake means effective and a second brake means arranged when effective to overcome said spring means and make said first brake means ineffective, and means actuated in response to the torque applied to said output gear for making said second brake means effective and the first brake means ineffective.

22. In a power transmission, an input member comprising a gear, an output member comprising a gear mounted coaxially with said input gear, reduction gearing connecting said input gear to said output gear to drive the output gear at a lower speed but in the same direction as said input gear, a support for said reduction gearing rotatable around the axis of said input and output gears, means operative at times to prevent such rotation of said support, means for arresting rotation of said reduction gears on their axes and simultaneously permitting said support to revolve around the axis of the input and output gears, whereby said input gear causes said output gear to rotate at the same speed as the input gear, the means for arresting rotation of the reduction gears on their axes comprising brake means therefor, spring means biased to make said brake means effective and a second brake means arranged when effective to overcome said spring means and make said first brake means ineffective, and means actuated in response to the torque applied to said output gear for making said second brake means effective, said actuated means comprising a member operable to make said first brake means ineffective, said member being actuated by cam means comprising two helical cam members one connected to the output gear and the other to an output member driven by said output gear through spring means.

23. In a power transmission, an input member comprising a gear, an output member comprising a gear mounted coaxially with said input gear, reduction gearing connecting said input gear to said output gear to drive the output gear at a lower speed but in the same direction as said input gear, a support for said reduction gearing rotatable around the axis of said input and output gears, means operative at times to prevent such rotation of said support, means for arresting rotation of said reduction gears on their axes and simultaneously permitting said support to revolve around the axis of the input and output gears, whereby said input gear causes said output gear to rotate at the same speed as the input gear, the means for arresting rotation of the reduction gears on their axes comprising brake means therefor, spring means biased to make said brake means effective and a second brake means arranged when effective to overcome said spring means and make said first brake means ineffective, and means actuated in response to the torque applied to said output gear for making said second brake means effective, said actuating means comprising a member operable to make said first brake means effective, a second member, a spring-biased lost-motion connection between said members and means responsive to the torque acting on the output gear for operating said second member.

24. In a power transmission comprising a member adapted to be driven by a source of power, speed change mechanism having means for driving its output member in reverse direction and means for automatically changing the speed ratio forwardly through said speed change mechanism to its output member in accordance with the torque acting thereon, means for driving said output member reversely in low ratio, a normally disengaged speed-responsive clutch between said power driven member and said speed change mechanism so arranged as to positively couple said power driven member to said speed change mechanism when the power driven member attains a predetermined speed, together with manually adjustable control means so constructed and arranged that in one position of adjustment it prevents engagement of said clutch irrespective of the speed of said power driven member and when in another position of adjustment the clutch is positively engaged when said power driven member attains a predetermined speed to cause said speed change mechanism to be driven under torque control and when in a third position of adjustment said control means causes said speed change mechanism to rotate its output member in the reverse direction.

25. In a power transmission comprising a member adapted to be driven by a source of power, speed change mechanism having means for automatically changing the speed ratio therethrough to its output member in accordance with the torque acting thereon, a normally disengaged speed-responsive clutch between said power driven member and said speed change mechanism so arranged as to couple said power driven member to said speed change mechanism when the power driven member attains a predetermined speed, together with manually adjustable control means so constructed and arranged that in one position of adjustment it prevents engagement of said clutch irrespective of the speed of said power driven member and when in another position of adjustment the clutch is positively engaged when said power driven member attains predetermined speed to cause said speed change mechanism to be driven under torque control and when in a third position of adjustment said control means causes said speed change mechanism to rotate its output member at a lower speed ratio irrespective of the torque to which said speed change mechanism is subjected.

26. In a power transmission comprising a member adapted to be driven by a source of power, speed change mechanism having means for driving its output member in reverse direction and means for automatically changing the speed ratio forwardly through said speed change mechanism to its output member in accordance with the torque acting thereon, means for driving said output member reversely in low ratio, a normally disengaged speed-responsive clutch between said power driven member and said speed change mechanism so arranged as to positively couple said power driven member to said speed change mechanism when the power driven member attains a predetermined speed, together with manually adjustable control means so constructed and arranged that in one position of adjustment it prevents engagement of said clutch irrespective of the speed of said power driven member and when in another position of adjustment the clutch is positively engaged when said power driven member attains predetermined speed to cause said speed change mechanism to be driven under torque control and when in a third position of adjustment said control means causes said speed change mechanism to rotate its output member at a lower speed ratio irrespective of the torque to which said speed change mechanism is subjected, and when in a fourth position of adjustment said control means causes said speed change mechanism to rotate its output member in the reverse direction.

27. In a power transmission an input member, an output member and speed change mechanism therebetween, means to vary the speed ratio therethrough, and means governed by the torque applied to the output member to adjust the speed change mechanism for various speed ratios, said torque-responsive adjusting means comprising a member driven by the output member and having a limited rotative motion relative thereto, and a plurality of springs between said relatively rotatable parts at least one of which is always under circumferential stress and another or others of said springs are brought under stress as the torque is increased, together with means for converting relative circumferential motion as permitted by said springs into axial movement, and axially movable means adapted to control the speed change mechanism for various speed ratios.

28. In a power transmission comprising a member adapted to be driven by a source of power, speed change mechanism having means for automatically changing the speed ratio therethrough to its output member in accordance with the torque acting thereon, a normally disengaged speed-responsive clutch between said power driven member and said speed change mechanism so arranged as to positively couple said power driven member to said speed change mechanism when the power driven member attains a predetermined speed, means controlling the clutch to prevent its engagement irrespective of the speed of said power driven member, and manually operable means for controlling the transmission drive ratio and also said clutch controlling means, comprising a manually adjustable control handle movable in two planes substantially parallel to each other, members for controlling said transmission, each movable from a normal position to at least one other position by said handle when the handle has been moved toward said respective member and means for normally positively locking both movable members in normal position and for positively locking in normal position that member which is not to be moved, comprising a shiftable member having means which when said shiftable member is in normal central position locks both movable members in normal position, said shiftable member being so arranged that when the handle is moved to a position for moving one of said movable members the shiftable member is moved thereby in such manner that said means on said shiftable member serve to release for movement the said movable member while continuing to lock the other movable member in normal position, and connections from said movable members to said transmission to control the speed ratio of said transmission and to said clutch control means.

29. A power transmission comprising a member adapted to be rotated by a source of power, speed change mechanism having means for automatically changing the speed ratio therethrough to its output member, a normally disengaged speed-responsive clutch between said power driven member and said speed change mechanism having centrifugally operated means so arranged as normally to couple positively said power driven member to said speed change mechanism when the power driven member attains a predetermined speed, means for controlling the clutch to prevent its engagement irrespective of the speed of said power driven member by preventing operation of said centrifugally operated means, and manually operable means for controlling the transmission drive ratio and also said clutch controlling means, and connections from said controlling means to said transmission to control the speed ratio of said transmission and to said clutch control means.

30. A power transmission comprising a member adapted to be rotated by a source of power, speed change mechanism having means for driving its output member in reverse direction and means for automatically changing the speed ratio forwardly through said speed change mechanism to its output member in accordance with the torque acting thereon, means for driving said output member reversely in low ratio, a normally disengaged speed-responsive clutch between said power driven member and said speed change mechanism so arranged as normally to couple positively said power driven member to said speed change mechanism when the power driven member attains a predetermined speed, means controlling the clutch to prevent its engagement irrespective of the speed of said power driven member, and manually operable means for controlling the transmission drive ratio for low speed ratio, variable drive ratio, or reverse, and also said clutch controlling means, and connections from said controlling means to said transmission to control the speed ratio of said transmission and to said clutch control means to free the clutch for engagement at said predetermined speed when the transmission is controlled for low speed ratio, variable drive ratio, or reverse.

31. A power transmission comprising a member adapted to be rotated by a source of power, speed change mechanism having means for driving its output member in reverse direction and means for automatically changing the speed ratio forwardly through said speed change mechanism to its output member in accordance with the torque acting thereon, means for driving said output member reversely in low ratio, a normally disengaged speed-responsive clutch between said power driven member and said speed change mechanism so arranged as normally to couple positively said power driven member to said speed change mechanism when the power driven member attains a predetermined speed, means controlling the clutch to prevent its engagement irrespective of the speed of said power driven member, and manually operable means for controlling the transmission drive ratio for variable drive ratio, or reverse, and also said clutch controlling means, and connections from said controlling means to said transmission to control the speed ratio of said transmission and to said clutch control means to free the clutch for engagement at said predetermined speed when the transmission is controlled for variable drive ratio, or reverse.

32. A power transmission comprising a member adapted to be rotated by a source of power, speed change mechanism having means for automatically changing the speed ratio therethrough to its output member in accordance with the torque acting thereon, a speed-responsive clutch between said power driven member and said speed change mechanism so arranged as to couple said power driven member to said speed change mechanism when the power driven member attains a predetermined speed, means settable to prevent engagement of the clutch, and a manually adjustable control means common to said transmission and said clutch so constructed and arranged that in one position of adjustment it causes said settable means to move to a position where it prevents engagement of said clutch irrespective of the speed of said power driven member and when in another position of adjustment the transmission is made effective to transmit power at various speed ratios and the clutch is freed so that it may be engaged when said power driven member attains a predetermined speed.

33. A power transmission comprising a member adapted to be rotated by a source of power, speed change mechanism having means for driving its output member in reverse direction and means controllable for changing the speed ratio forwardly through said speed change mechanism, to its output member means for driving said output member reversely in low ratio, a normally disengaged speed-responsive clutch between said power driven member and said speed change mechanism arranged to couple said power driven member to said speed change mechanism when the power driven member attains a predetermined speed, together with manually adjustable control means common to said clutch and said speed change mechanism so constructed and arranged that in one position of adjustment it prevents engagement of said clutch irrespective of the speed of such power driven member and when in another position of adjustment the clutch is positively engaged when said power driven member attains a predetermined speed to cause said speed change mechanism to be so operated as to rotate said output member forwardly and when in a third position of adjustment said common control means sets the speed change mechanism to rotate its output member in the reverse direction and also enables said clutch to engage when the power driven member attains said predetermined speed.

34. A power transmission comprising a member adapted to be rotated by a source of power, speed change mechanism having means for driving its output member in reverse direction and means for changing the speed ratio forwardly through said speed change mechanism to its output member, means influenced by the torque in said output member connected to for operating the said speed ratio changing means, means for driving said output member reversely in low ratio, a normally disengaged speed-responsive clutch between said power driven member and said speed change mechanism arranged to couple said power driven member to said speed change mechanism when the power driven member attains a predetermined speed, together with manually adjustable control means common to said clutch and said speed change mechanism so constructed and arranged that in one position of adjustment it prevents engagement of said clutch irrespective of the speed of such power driven member and when in another position of adjustment the clutch is positively engaged when said power driven member attains a predetermined speed to cause said speed change mechanism to be so operated as to rotate said output member forwardly while under control of said torque influenced means and when in a third position of adjustment said common control means sets the speed change mechanism to rotate its output member in the reverse direction and also enables said clutch to engage when the power driven member attains said predetermined speed.

35. A power transmission comprising a member adapted to be rotated by a source of power, speed change mechanism having means controllable for changing the speed ratio therethrough to its output member, a normally disengaged speed-responsive clutch between said power driven member and said speed change mechanism arranged to couple said power driven member to said speed change mechanism when the power driven member attains a predetermined speed, together with manually adjustable control means common to said clutch and said speed change mechanism and settable to a neutral position in which position of adjustment it prevents engagement of said clutch irrespective of the speed of such power driven member and settable to at least one other position of adjustment in which the clutch is positively engaged when said power driven member attains a predetermined speed to cause said speed change mechanism to be operated by said source of power and to rotate said output member, the said control means being so constructed that it cannot be adjusted away from the said neutral position when the said source of power is rotating above said predetermined speed.

36. A power transmission comprising a member adapted to be rotated by a source of power, speed change mechanism having means for driving its output member in reverse direction and means controllable for changing the speed ratio forwardly through said speed change mechanism to its output member, means for driving said output member reversely in low ratio, a normally disengaged speed-responsive clutch between said power driven member and said speed change mechanism arranged to couple said power driven member to said speed change mechanism when the power driven member attains a predetermined speed, together with manually adjustable control means common to said clutch and said speed change mechanism so constructed and arranged that in one position of adjustment it prevents engagement of said clutch irrespective of the speed of such power driven member and when in another position of adjustment the clutch is positively engaged when said power driven member attains a predetermined speed to cause said speed change mechanism to be so operated as to rotate said output member forwardly and when in a third position of adjustment said common control member sets the speed change mechanism to rotate its output member forwardly at a predetermined drive ratio and also enables said clutch to engage when the power driven member attains said predetermined speed, and when in a fourth position of adjustment said common control means sets the speed change mechanism to rotate its output member in the reverse direction and also enables said clutch to engage when the power driven member attains said predetermined speed.

37. A power transmission comprising a member adapted to be rotated by a source of power, speed change mechanism having means for driving its output member in reverse direction and means for changing the speed ratio forwardly through said speed change mechanism to its output member, means influenced by the torque in said output member connected to for operating the said speed ratio changing means, means for driving said output member reversely in low ratio, a normally disengaged speed-responsive clutch between said power driven member and said speed change mechanism arranged to couple said power driven member to said speed change mechanism when the power driven member attains a predetermined speed, together with manually adjustable control means common to said clutch and said speed change mechanism so constructed and arranged that in one position of adjustment it prevents engagement of said clutch irrespective of the speed of such power driven member and when in another position of adjustment the clutch is positively engaged when said power driven member attains a predetermined speed to cause said speed change mechanism to be so operated as to rotate said output member forwardly while under control of said torque influenced means and when in a third position of adjustment said common control member sets the speed change mechanism to rotate its output member forwardly at a predetermined drive ratio and also enables said clutch to engage when the power driven member attains said predetermined speed, and when in a fourth position of adjustment said common control means sets the speed change mechanism to rotate its output member in the reverse direction and also enables said clutch to engage when the power driven member attains said predetermined speed.

38. A power transmission comprising a member adapted to be rotated by a power input member, speed change mechanism having means for driving its output member in reverse direction and means for automatically changing the speed ratio therethrough forwardly to its output member in accordance with the torque acting thereon, means for controlling said speed change mechanism to actuate its output member reversely in low ratio, a clutch so arranged as normally to couple positively said input member to said speed change mechanism when said input member attains a predetermined speed, means for preventing said clutch from becoming engaged irrespective of the speed of said input member, a control mechanism for controlling said speed change mechanism for forward drive, or for reverse drive and for controlling said clutch engagement preventing means to free said clutch for engagement at said predetermined speed when the speed change mechanism is controled for said forward speed, or said reverse speed, and means for preventing the adjustment of said control mechanism from forward drive to reverse drive when said driven member is rotating in excess of said predetermined speed and said clutch is engaged.

39. A power transmission comprising a member adapted to be rotated by a source of power, speed change mechanism having means for driving its output member in reverse direction and means controllable for changing the speed ratio forwardly through said speed change mechanism to its output member or for driving said output member reversely in low ratio, a normally disengaged speed-responsive clutch between said power driven member and said speed change mechanism arranged to couple said power driven member to said speed change mechanism when the power driven member attains a predetermined speed, together with manually adjustable control means common to said clutch and said speed change mechanism and settable to a neutral position in which position of adjustment it prevents engagement of said clutch irrespective of the speed of such power driven member and settable to another position of adjustment in which the clutch is positively engaged when said power driven member attains a predetermined speed to cause said speed change mechanism to be operated by said source of power and to rotate said output member forwardly, and settable to a third position of adjustment in which the clutch is positively engaged when said power driven member attains a certain speed to cause said speed change mechanism to be operated by said source of power to rotate said output member reversely, the said control means being so constructed that it cannot be adjusted from the said neutral position to reverse position when the said source of power is rotating above said predetermined speed.

40. A machine comprising a rotary power source, speed change mechanism having an input member, an output member and means controliable for changing the drive ratio therethrough to the output member, an engageable and disengageable clutch between said power source and the input member of said speed change mechanism, and a one way drive connection between said power source and said input member so arranged that the power source may rotate forwardly relative to said input member when urged by forces acting through said speed change mechanism but the input member cannot rotate forwardly relative to the rotary power source irrespective of the direction of the torque being applied by said output member to the speed change mechanism and therethrough to said input member, whereby the multiplication of said torque through said speed change mechanism increases the resistance of said rotary power source so that said power source may be used as a more effective brake whether or not said clutch is engaged.

41. A self-propelled vehicle comprising a rotary power source, speed change mechanism having an input member, an output member and means controllable for changing the drive ratio therethrough to the output member, a speed-responsive clutch between said rotary power source and the input member of said speed change mechanism so arranged as to be engaged only when the rotary power source speed exceeds a certain magnitude, and a one way drive connection between said rotary power source and said input member so arranged that the rotary power source may rotate forwardly relative to said input member but the input member cannot rotate forwardly relative to the rotary power source, irrespective of the direction of the torque being applied by said output member to said speed change mechanism and therethrough to said input member, whereby the multiplication of said torque by said speed change mechanism may be used to drive said rotary power source at a higher speed to start it by the pushing or pulling of said vehicle even when said speed responsive clutch is disengaged.

42. A power transmission comprising a member adapted to be rotated by a source of power, speed change mechanism having means for driving its output member in reverse direction and means for automatically changing the speed ratio therethrough forwardly to its output member under the influence of the torque in said output member, means for driving said output member reversely in low ratio, a normally disengaged speed-responsive clutch between said power driven member and said speed change mechanism so arranged as normally to couple positively said power driven member to said speed change mechanism when the power driven member attains a predetermined speed, means controlling the clutch to prevent its engagement irrespective of the speed of said power driven member, and manually operable means for controlling the transmission drive ratio for one of a plurality of forward drive ratios under torque control, for one of less than said plurality of said forward drive ratios under torque control, or for reverse, and also so controlling said clutch controlling means as to free the clutch for engagement at said predetermined speed only when the transmission is controlled for forward drive or reverse.

43. In a power transmission comprising a conditioned speed change mechanism to said input member, whereby said rotary power source may be rotated at a higher speed to start said rotary power source by pushing or pulling said vehicle although said clutch is ineffective.

49. A self-propelled vehicle comprising a rotary power source, a speed change mechanism constantly conditioned for driving, having an input member and an output member and means controllable for changing the speed ratio therethrough to its output member; a speed-responsive clutch so arranged as to be effective for connecting said rotary power source and the input member of said speed change mechanism only when the rotary power source speed exceeds a certain magnitude, a control device which may be moved from one position to another to accomplish varied control of said speed change mechanism and when in a particular one of said control positions prevents said clutch from being effective regardless of said rotary power source speed, and a one way drive connecting device between said rotary power source and said input member so arranged that said rotary power source may rotate forwardly relative to said input member but the input member cannot rotate forwardly relative to the rotary power source when torque is applied by said output member to said constantly drive conditioned speed change mechanism and therethrough to said input member, whereby the rotary power source may be rotated to start it by pushing or pulling said vehicle although said speed-responsive clutch is ineffective, and whereby when said control device is in said particular one of said control positions said main clutch is rendered ineffective so the rotary power source will start and may run at any speed without driving said vehicle.

50. In a machine having a driving member adapted to be driven in one direction by a source of power, and an output member operable in a plurality of directions, the combination of a mechanism intermediate said driving member and said output member comprising means directly connected to said driving member for driving said output member in one of said directions and a second means directly connected to said driving member for driving said output member in another of said directions, and a device intermediate said first and second means, which device is engaged with said output member and is axially adjustable for driving engagement with either said first or said second means whereby said output member is driven in one of said directions in accordance with the unidirectional movement of said device and of the drivingly engaged one of said means.

51. A power transmission adapted to control the transmission of power from a rotary power source to a rotary driven member, comprising a transmission mechanism having an input member and an output member together with gears providing a driving connection at all times from said input member to said output member so that when said input member is driven the output member is also driven, either forwardly at various speed ratios or reversely, a speed-responsive clutch between said power source and said input member and a control mechanism common to said clutch and said transmission serving to determine the drive through the transmission and simultaneously to determine whether the clutch is to engage when the power source attains the predetermined speed.

52. A machine having a power source which may be rotated at various speeds, a change speed transmission comprising an input member so constructed that the motion from said power source may be applied to said input member and may be transmitted forwardly or reversely to a driven member, a speed responsive clutch for connecting said power source with said input member to drive said driven member when the power source attains a predetermined speed, a control device which may be moved to condition said transmission to operate forwardly or reversely and to control said clutch in such a way as to prevent it from being engaged, together with a safety device so constructed that, when said control device is in a position to control said transmission to operate in one direction and said clutch is engaged so that said power source is driving said transmission and said driven member it prevents said transmission from being conditioned to operate in the reverse direction unless said power source is first operated at a speed which is less than said predetermined speed.

53. In a power transmission comprising a driving member adapted to be rotated by a source of power; a speed change mechanism having an input member, an output member, means providing a reverse drive between said input member and said output member, means for conditioning said speed change mechanism to provide a forward drive variable low speed range of more than one ratio, means for conditioning said speed change mechanism to provide a forward drive variable high speed range of at least one higher speed drive ratio than provided in said low speed range, and means for automatically changing the speed ratio therethrough in said ranges to its output member in accordance with the torque applied to said output member; a speed responsive clutch between said driving member and said input member so arranged as to be ineffective for driving said input member when said driving member is being operated at speeds less than a certain magnitude and effective for driving said input member when said driving member is being operated at speeds greater than a certain magnitude, and adjustable control means for conditioning said speed change mechanism for said reverse drive, said low speed range, or said high speed range.

54. A power transmission comprising a main support shaft, a speed change mechanism having an input member mounted on said shaft and comprising a gear, an output member mounted coaxially with said input gear on said shaft and comprising a gear, a reversing output member mounted coaxially with said input gear on said shaft and comprising a gear, reduction gearing connecting said input gear to said output gear to drive said output gear at a lower speed but in the same direction as said input gear and connecting said input gear to said reversing output gear to drive said reversing output gear at a lower speed and in the reverse direction, a support for said reduction gearing rotatable around the axes of said input, output and reversing output gears and mounted on said shaft; a shiftable device mounted on said shaft which device may be manipulated to coadunately engage said output member to be driven forwardly or said reversing output member to be driven reversely, a driven member mounted in axial alignment with said shaft, a torque responsive means mounted on said shaft connected to said shiftable device and said driven member for transmitting motion from said shiftable device to said driven memmember adapted to be rotated by a source of power, speed change mechanism having an input member and an output member and means providing a reverse, a variable low speed ratio range and a variable high speed ratio range between said input member and said output member and having means for automatically changing the speed ratio therethrough in said ranges to its output member, a clutch so arranged as normally to couple said power driven member to said speed change mechanism when said power driven member attains a predetermined speed, controlling means for said clutch to prevent its engagement irrespective of the speed of said power driven member, and control mechanism for controlling the transmission for neutral, variable low speed range, variable high speed range, or reverse, and also said clutch controlling means to free said clutch for engagement at said predetermined speed when the transmission is controlled for said variable low speed ratio, said variable high speed ratio, or reverse.

44. In a machine having a driving member adapted to be rotated by a source of power, and an output member operable in a plurality of directions; the combination of mechanism intermediate said driving member and said output member comprising means which at all times is drivingly coupled with said driving member and which is solely for driving said output member in one of said directions and a second means which at all times is drivingly coupled with said driving member and which is solely for driving said output member in another of said directions, and a device intermediate said first and second means, which device is coupled with said output member and is axially adjustable either for engagement with said first means, or for engagement with said second means whereby said device and the engaged one of said means rotate unidirectionally for driving said output member in the one of said plurality of directions dependent upon which one of said means is engaged.

45. In a machine having a driving member adapted to be rotated by a source of power, and an output member operable in a plurality of directions; the combination of a mechanism intermediate said driving member and said output member comprising means which at all times is drivingly coupled with said driving member and which is solely for driving said output member in one of said directions and a second means which at all times is drivingly coupled with said driving member and which is solely for driving said output member in another of said directions, and a device intermediate said first and second means, which device is coupled with said output member and is axially adjustable either for engagement with said first means or for engagement with said second means whereby said driving member, said mechanism and said device drive said output member in the one of said directions as determined by that one of said means with which said device is engaged.

46. The combination of a rotary power source, a speed change mechanism having an input member, an output member and means for driving its output member in reverse direction and means controllable for changing the speed ratio therethrough to its output member, a clutch so arranged as to be effective or ineffective for transmitting motion from said rotary power source to said input member to effectively drive said speed change mechanism, a manual control for variably controlling said speed change mechanism and for controlling said clutch to be effective or ineffective and a one way drive connecting device between said rotary power source and said input member so arranged as to be ineffective for connecting said rotary power source to said input member when said rotary power source is operating forwardly relative to said input member but to be effective for connecting said rotary power source to said input member when said input member is rotated forwardly, through said speed change mechanism, relative to said rotary power source, whereby through the lower ratios of said speed change mechanism said input member may drive said rotary power source at a higher speed whether or not said clutch is controlled to be effective by said control.

47. The combination of a rotary power source, a speed change mechanism having an input member and an output member and means controllable for changing the speed ratio therethrough to its output member, a clutch so arranged as to be effective or ineffective for transmitting motion from said rotary power source to said input member to effectively drive said speed change mechanism, control means for rendering said clutch ineffective, and a one way drive connecting device between said rotary power source and said input member so arranged as to be ineffective for connecting said rotary power source to said input member when said rotary power source is operating forwardly relative to said input member but to be effective for connecting said rotary power source to said input member when said input member is rotated forwardly relative to said rotary power source irrespective of the direction of the reverse torque being applied by said output member through the speed change mechanism to said input member, whereby the multiplication of said reverse torque through said speed change mechanism increases the resistance of the rotary power source so that said power source may be used as a more effective brake whether or not said clutch is rendered ineffective by said control.

48. A self-propelled vehicle comprising a rotary power source, a speed change mechanism constantly conditioned for driving having an input member and an output member and means controllable for changing the speed ratio therethrough to its output member, a manual control which may be moved to any one of a plurality of positions to variably control said speed change mechanism, a clutch also controlled by said manual control to be operative or inoperative, and when rendered operative by said manual control is effective for transmitting motion from said rotary power source to said input member of said speed change mechanism only when said rotary power source is rotating at a speed which exceeds a certain magnitude, and a one way drive connecting device between said rotary power source and said input member so arranged as to be ineffective for connecting said rotary power source to said input member when said rotary power source is operating forwardly relative to said input member, but to be effective for connecting said rotary power source to said input member when said input member is rotated forwardly through said speed change mechanism relative to said rotary power source irrespective of the direction of the reverse torque being applied by said output member through said constantly driveber and responding to the torque exerted thereon, a brake means effective at times to prevent the rotation of said support, a second brake means for arresting rotation of said reduction gears on their axes and simultaneously permitting said support to revolve on said shaft around the axes of said input and output gears, and control mechanism operated by said torque responsive means for making said second brake means effective and comprising movable connections interconnecting said torque responsive means and said second brake means, whereby when said shiftable device is manipulated to coadunately engage said output member the revolving of said input member causes said driven member to revolve forwardly in a low speed ratio when said brake means is effective and said second brake means is ineffective and in a high speed ratio when said second brake means is effective and said brake means is ineffective, said brake means and said second brake means being made effective or ineffective by said torque responsive means through said control mechanism in accordance with the torque applied to said torque responsive means, and whereby when said shiftable device is manipulated to coadunately engage said reversing output member the revolving of said input member causes said driven member to revolve reversely.

55. In a power transmission a journaled main shaft; a plurality of ratio changing mechanisms, each having an input member comprising a gear and an output member comprising a gear, each of said members being rotatably mounted on said main shaft and each of said ratio changing mechanisms having ratio-change gearing connecting said input gear to said output gear to drive said output gear at a different ratio but in the same direction as the input gear, a support for said ratio-change gearing rotatably mounted in part on said input member and in part on said main shaft and means for arresting rotation of said ratio-change gears on their axes and simultaneously permitting said support to revolve about said main shaft, whereby said input gear causes said output gear to rotate at the same rate as the input gear, said ratio changing mechanisms being so arranged in tandem that the output gear of one of said ratio changing mechanisms is connected to the input gear of another of said ratio changing mechanisms, the ratios of the ratio changing mechanisms being different, and the input member of the ratio changing mechanism first in series having a speed responsive clutch adapted to be operated by a rotary source of power for drivingly coupling the said input member and said rotary power source; a forward driving means rotatably mounted on said main shaft and connected to the output member of the ratio changing mechanism last in series; a reverse driving means rotatably mounted on said output member and constantly engaged with the output gear of said last in series ratio changing mechanism; spring biased means slidably mounted on said main shaft for drivingly coupling with either said forward or said reverse driving means to accordingly rotate said main shaft; torque controlled means comprising a driven member rotatably mounted on said main shaft, said torque controlled means being secured in part to said main shaft and in part to said driven member and also comprising yielding connections therefrom to the arresting means of each of said ratio changing mechanisms and mechanism effective when a predetermined amount of torque is applied therein to operate by said yielding connections the arresting means of that ratio changing mechanism which provides a lesser gear ratio change and when a greater predetermined amount of torque is applied therein to operate by said yielding connections the arresting means of that ratio changing mechanism which provides a lower gear ratio change and to restore the previously operated arresting means to its original condition and when an even greater predetermined amount of torque is exerted therein to operate by said yielding connections the arresting means of each of a plurality of said ratio changing mechanisms to provide a still lower gear ratio; together with manually operable means for permitting said speed responsive clutch to become effective to drive said ratio changing mechanisms, and for governing said ratio changing mechanisms from providing ratio changes above a predetermined ratio irrespective of the amount of torque being exerted in said torque controlled means and for selectively conditioning said spring biased means to drive said driven member either forwardly or reversely.

56. A power transmission adapted to control the transmission of power from a rotary power source to a rotary driven member comprising the combination of a speed-responsive clutch having centrifugally operated means carried for rotation by said rotary power source adapted normally to engage said clutch when said rotary power source exceeds a predetermined speed, a variable drive ratio transmission, and control mechanism common to said variable drive ratio transmission and said centrifugally operated means arranged to control the drive ratio of said variable drive ratio transmission and to control said centrifugally operated means to prevent said centrifugally operated means operating to engage said clutch irrespective of the speed of rotation of said rotary power source.

57. A power transmission adapted to control the transmission of power from a rotary power source to a rotary driven member, comprising the combination of a clutch, a variable drive ratio transmission and control mechanism common to for controlling said clutch and the drive ratio of said transmission, said clutch being located between the power source and the variable drive ratio transmission and said clutch comprising speed-responsive means for normally engaging the clutch when the speed of the power source reaches a certain value, said clutch being provided with means adapted to engage said speed-responsive clutch engaging means while the speed-responsive clutch engaging means has not operated to engage said clutch, and prevent its acting to engage the clutch irrespective of the speed of said rotary power source, said engagement preventing means being also operated by said control mechanism.

WILLIAM S. GUBELMANN.

References Cited in the file of this patent

UNITED STATES PATENTS

| Number | Name | Date |
|---|---|---|
| 721,807 | Jeffery et al. | Mar. 3, 1903 |
| 741,686 | Lombard | Oct. 20, 1903 |
| 813,461 | Stacks | Feb. 27, 1906 |
| 1,010,273 | Low | Nov. 28, 1911 |
| 1,428,326 | Fay | Sept. 5, 1922 |
| 1,526,719 | Saives | Feb. 17, 1925 |

(Other references on following page)

UNITED STATES PATENTS

| Number | Name | Date |
|---|---|---|
| 1,547,401 | Patterson | July 28, 1925 |
| 1,599,123 | Fay | Sept. 7, 1926 |
| 1,693,139 | Dietsche | Nov. 27, 1928 |
| 1,839,088 | DeNormanville | Dec. 29, 1931 |
| 1,854,359 | Wilson | Apr. 19, 1932 |
| 1,920,038 | Thomas et al. | July 25, 1933 |
| 1,935,589 | Dodge | Nov. 14, 1933 |
| 1,975,835 | Farkas | Oct. 9, 1934 |
| 1,998,513 | Manville | Apr. 23, 1935 |
| 2,021,550 | Haycock | Nov. 19, 1935 |
| 2,022,689 | Rainsford | Dec. 2, 1935 |
| 2,062,523 | Miller | Dec. 1, 1936 |
| 2,075,944 | Hughes | Apr. 6, 1937 |
| 2,082,444 | Dodge | June 1, 1937 |
| 2,089,736 | Edwards | Aug. 10, 1937 |
| 2,112,487 | Freeborn | Mar. 29, 1938 |
| 2,113,624 | Madle | Apr. 12, 1938 |
| 2,132,728 | Ford | Oct. 11, 1938 |
| 2,167,873 | Burtnett | Aug. 1, 1939 |
| 2,168,856 | Banker | Aug. 8, 1939 |
| 2,174,835 | Rainsford | Oct. 3, 1939 |
| 2,177,662 | Kliesrath et al. | Oct. 31, 1939 |
| 2,188,246 | Mirone | Jan. 23, 1940 |
| 2,247,920 | Neff | July 1, 1941 |
| 2,290,513 | Wemp | July 21, 1942 |
| 2,296,532 | Mekeel | Sept. 22, 1942 |
| 2,328,090 | Nutt et al. | Aug. 31, 1943 |
| 2,328,091 | Nutt et al. | Aug. 31, 1943 |
| 2,338,413 | De Falco | Jan. 4, 1944 |

FOREIGN PATENTS

| Number | Country | Date |
|---|---|---|
| 42,895 | France (Addition to No. 722,588.) | Nov. 15, 1933 |
| 781,015 | France | May 8, 1935 |